United States Patent
Wentink et al.

(10) Patent No.: US 9,210,731 B2
(45) Date of Patent: Dec. 8, 2015

(54) DIRECT LINK SETUP THROUGH AN EXTENDED SERVICE SET

(75) Inventors: Maarten Menzo Wentink, Naarden (NL); Sidharth Thakur, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/557,117

(22) Filed: Jul. 24, 2012

(65) Prior Publication Data

US 2013/0201866 A1     Aug. 8, 2013

Related U.S. Application Data

(60) Provisional application No. 61/511,413, filed on Jul. 25, 2011.

(51) Int. Cl.
*H04W 76/02* (2009.01)
*H04W 28/22* (2009.01)
(Continued)

(52) U.S. Cl.
CPC ........ *H04W 76/023* (2013.01); *H04W 28/0268* (2013.01); *H04W 76/027* (2013.01); *H04W 28/22* (2013.01); *H04W 72/00* (2013.01); *H04W 72/02* (2013.01); *H04W 84/12* (2013.01)

(58) Field of Classification Search
CPC ... H04W 76/023; H04W 28/22; H04W 72/00; H04W 72/02; H04W 84/12; H04W 76/027; H04W 28/0268
See application file for complete search history.

(56) References Cited

U.S. PATENT DOCUMENTS

| | | | |
|---|---|---|---|
| 7,948,951 B2 | 5/2011 | Wentink | |
| 8,159,999 B2 | 4/2012 | Chandra et al. | |

(Continued)

FOREIGN PATENT DOCUMENTS

| | | | |
|---|---|---|---|
| JP | 2006093778 A | 4/2006 | |
| JP | 2006128949 A | 5/2006 | |

(Continued)

OTHER PUBLICATIONS

IEEE Standard for Information Technology. Telecommunications and Information Exchange Between Systems. Local and Metropolitan Area Networks. Specific Requirements Part 11: Wireless LAN Medium Access Control (MAC) and Physical Layer (PHY) Specifications Am, Standard No. IEEE STD 802.11Z-2010 (2010) IEEE, USA IEEE New York, NY, USA, [Online] Oct. 14, 2010, XP002617166, ISBN: 978-0-7381-6499-1 Retrieved from the Internet: URL:http://ieeexplore.ieee.org/xpls/abs_all.jsp"arnumber=5605400&tag=1> [retrieved on Jan. 17, 2011].

(Continued)

*Primary Examiner* — Alpus H Hsu
*Assistant Examiner* — Walter Divito
(74) *Attorney, Agent, or Firm* — Mahamedi Paradice LLP

(57) ABSTRACT

In a particular embodiment, a method includes storing first channel information related to a first communication channel that a first apparatus is capable of communicating over and a second communication channel that the first apparatus is communicating over via a first access point. The method also includes receiving a direct link setup message from a second apparatus to form a direct link between the first apparatus and the second apparatus. The direct link setup message includes second channel information related to a third communication channel the second apparatus is capable of communicating over and a fourth communication channel the second apparatus is communicating over via a second access point. The method further includes selecting at least one communication channel for communication based on the first channel information and the second channel information.

37 Claims, 8 Drawing Sheets

(51) Int. Cl.
*H04W 72/00* (2009.01)
*H04W 72/02* (2009.01)
*H04W 84/12* (2009.01)
*H04W 28/02* (2009.01)

(56) References Cited

U.S. PATENT DOCUMENTS

| | | | |
|---|---|---|---|
| 2005/0036469 A1* | 2/2005 | Wentink | 370/338 |
| 2005/0122927 A1* | 6/2005 | Wentink | 370/311 |
| 2006/0087995 A1 | 4/2006 | Nago | |
| 2007/0171936 A1* | 7/2007 | Hazra et al. | 370/465 |
| 2008/0075038 A1 | 3/2008 | Jin et al. | |
| 2008/0305744 A1* | 12/2008 | Furuskar et al. | 455/67.11 |
| 2009/0268653 A1 | 10/2009 | Itagaki et al. | |
| 2010/0153727 A1 | 6/2010 | Reznik et al. | |
| 2010/0177712 A1 | 7/2010 | Kneckt et al. | |
| 2010/0238871 A1* | 9/2010 | Tosic et al. | 370/329 |
| 2010/0246502 A1 | 9/2010 | Gong et al. | |
| 2011/0090821 A1 | 4/2011 | Seok | |
| 2012/0057577 A1 | 3/2012 | Dwivedi et al. | |
| 2012/0275443 A1* | 11/2012 | Shpak | 370/338 |
| 2013/0058248 A1* | 3/2013 | Singh et al. | 370/252 |
| 2013/0077477 A1* | 3/2013 | Daraiseh et al. | 370/225 |
| 2013/0077611 A1 | 3/2013 | Shaikh et al. | |

FOREIGN PATENT DOCUMENTS

| | | |
|---|---|---|
| JP | 2009515477 A | 4/2009 |
| JP | 2009267936 A | 11/2009 |
| WO | WO-2007055993 A1 | 5/2007 |
| WO | 2007095396 A1 | 8/2007 |
| WO | WO-2010044533 A1 | 4/2010 |

OTHER PUBLICATIONS

IEEE Std 802.11™ 2007 "Standard for Information technology—Telecommunications and information exchange between systems—Local and metropolitan area networks—specific requirements Part 11: Wireless LAN Medium Access Control (MAC) and Physical layer (PHY) Specifications," Jun. 2007.

International Search Report and Written Opinion—PCT/US2012/048140—ISA/EPO—Nov. 2, 2012.

Luise Marco et al., "Carrier Frequency Recovery in All-Digital Modems for Burst-Mode Transmissions", IEEE Transactions on Communications, vol. 43, No. 2/3/4, Feb./Mar./Apr. 1999, p. 1169-1178.

Van De Beek, "ML Estimation of Time and Frequency Offset in OFDM Systems," IEEE Transactions on Signal Processing, 1997, 45 (7), p. 1800-1805.

* cited by examiner

DIRECT LINK SETUP THROUGH AN EXTENDED SERVICE SET

I. CROSS REFERENCE TO RELATED APPLICATIONS

The present application claims the benefit of and priority from U.S. Provisional Application No. 61/511,413 filed Jul. 25, 2011, the contents of which are expressly incorporated herein by reference in their entirety.

II. FIELD OF THE DISCLOSURE

The present disclosure generally relates to wireless communication, and in particular, to systems, methods, and devices to enable direct link setup through an extended service set (ESS) in a wireless local area network (WLAN) system.

III. BACKGROUND

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), a metropolitan area network (MAN), a local area network (LAN), or a personal area network (PAN). Networks also differ according to switching techniques and/or routing techniques used to interconnect various network nodes and devices (e.g. circuit switching vs. packet switching), a type of physical media employed for transmission (e.g. wired vs. wireless), and a set of communication protocols used (e.g. Internet protocol suite, Synchronous Optical Networking (SONET), Ethernet, etc.).

Wireless networks are often preferred when network elements are mobile and thus have dynamic connectivity needs, or if a network architecture is formed in an ad-hoc, rather than fixed, topology. Wireless networks employ intangible physical media in an unguided propagation mode using electromagnetic waves in radio frequency bands, microwave frequency bands, infra-red frequency bands, optical frequency bands, etc. Wireless networks advantageously facilitate mobility and rapid field deployment when compared to fixed, wired networks. However, wireless communication requires significant active resource management among network user devices and higher levels of mutual coordination and cooperation for compatible spectrum utilization as compared to wired communication.

In a single basic service set (BSS), a first station (STA) and a second STA may both be associated with the same access point (AP) and communicate via the AP. Within the single BSS, the first STA may establish a direct link for direct communication (e.g., not via the AP) with the second STA. Prior to establishing the direct link, all messages between the first STA and the second STA are routed via the AP of the single BSS. Because the first STA and the second STA are in the same BSS (i.e., associated with the single AP), both the first STA and the second STA communicate with the single AP using the same communication channel(s).

In an extended service set (ESS), a first AP associated with a first BSS may be connected to a second AP associated with a second BSS. The connection may be a bridged connection (i.e., a layer 2 connection). A first STA in the first BSS may communicate with a second STA of the second BSS via the first AP and the second AP. In the ESS, the first STA of the first BSS is generally unaware of the communication channel used by the second STA in the second BSS. Thus, direct link procedures applied to two STAs in the same BSS may not be sufficient to establish a direct link between two STAs in different BSSs at least because the first STA and the second STA are not associated and communicating with a single AP using the same communication channel(s).

IV. SUMMARY

Systems, methods, and devices for forming direct links between devices in an extended service set (ESS) are described herein. The devices may exchange information about communication channels the devices are capable of communicating over and/or are actually communicating over. Further, the devices may select a channel for communication based on the exchanged information.

In a wireless local area network (WLAN) ESS including at least a first BSS and a second BSS, two STAs may be enabled to establish a direct link. A first STA in the first BSS may communicate with a first AP using a first communication channel and a second STA in the second BSS may communicate with a second AP using a second communication channel. The second communication channel may be different than the first communication channel. The system may be configured to enable the first STA to communicate with the second STA via the first AP and the second AP. Additionally, the first STA may establish a direct link with the second STA using a direct link setup procedure (e.g., a tunneled direct link setup (TDLS) procedure) that includes an exchange of channel information between the first STA and the second STA. For example, the exchanged channel information may include an identification of one or more communication channels that each of the first STA and the second STA are communicating over (e.g., via a corresponding associated AP) and one or more communication channels that the first STA and the second STA are capable of communicating over.

After the exchange of information, a probe message may be transmitted via a selected channel (e.g., a common communication channel) to test for communication and/or to test a data rate associated with the selected channel. Depending on the estimated data rate of the selected channel, the STAs may use the selected channel for the direct link and communicate via the selected channel. If the estimated data rate of the selected channel is determined to be insufficient (e.g., as compared to a threshold rate or a data rate via an alternate communication path that is not the direct link), the STAs may try a different channel. In a particular embodiment, when the selected channel is insufficient, the STAs may forego the direct link and communicate via one or more APs.

Systems, methods, and devices (e.g., apparatuses) described herein each have several aspects. Without limiting the scope of the claims which follow, some features are described briefly below. After considering this description, and particularly after reading the section entitled "Detailed Description," it will be understood how features of the systems, the methods, and the devices allow direct link setup between devices associated with different APs in the same ESS.

In a particular embodiment, a method of operating a first wireless apparatus includes storing first channel information. The first channel information is related to one or more first communication channels that the first wireless apparatus is capable of communicating over and one or more second communication channels that the first wireless apparatus is communicating over via a first access point. The method also includes receiving a direct link setup message from a second wireless apparatus to form a direct link between the first wireless apparatus and the second wireless apparatus. The direct link setup message includes second channel information. The second channel information is related to one or more third communication channels the second wireless apparatus is capable of communicating over and one or more fourth communication channels the second wireless apparatus is communicating over via a second access point. The one or more second communication channels may be different than the one or more fourth communication channels. The method further includes selecting at least one communication channel for communication based on the first channel information and the second channel information.

In a particular embodiment, the method further includes selecting the at least one communication channel for communication directly between the first wireless apparatus and the second wireless apparatus based on the first channel information and the second channel information. In another particular embodiment, the method further includes selecting at least one of the one or more second communication channels as the at least one communication channel when the first communication channels do not include at least one of the one or more fourth communication channels. In another particular embodiment, the method further includes selecting at least one of the one or more fourth communication channels as the at least one communication channel when the one or more third communication channels do not include at least one of the one or more of second communication channels.

In another particular embodiment, the method further includes selecting at least one of the one or more second communication channels as the at least one communication channel when the first wireless apparatus initiated a direct link setup (e.g., a TDLS direct link setup). In another particular embodiment, the method includes selecting at least one of the one or more second communication channels as the at least one communication channel when the second wireless apparatus initiated a direct link setup (e.g., a TDLS direct link setup). In another particular embodiment, the method further includes selecting at least one of the one or more fourth communication channels as the at least one communication channel when the second wireless apparatus initiated a direct link setup (e.g., a TDLS direct link setup). In another particular embodiment, the method further includes selecting at least one of the one or more fourth communication channels as the at least one communication channel when the first wireless apparatus initiated a direct link setup (e.g., a TDLS direct link setup).

In another particular embodiment, a wireless apparatus includes a first transceiver configured to receive a direct link setup message from a second transceiver as part of forming a direct link between the first transceiver and the second transceiver. The wireless apparatus further includes a memory configured to store first channel information regarding one or more first communication channels the first transceiver is capable of communicating over and one or more second communication channels the first transceiver is communicating over via a first access point. The direct link setup message includes second channel information regarding one or more third communication channels the second transceiver is capable of communicating over and one or more fourth communication channels the second transceiver is communicating over via a second access point. The wireless apparatus further includes a processor configured to select at least one communication channel for communication based on the first channel information and the second channel information.

In another particular embodiment, a wireless apparatus includes first means for communicating information with a second means for communicating. The first means for communicating is configured to receive a direct link setup message from the second means for communicating as part of forming a direct link between the first means for communicating and the second means for communicating. The wireless apparatus further includes means for storing first channel information regarding one or more first communication channels the first means for communicating is capable of communicating over and one or more second communication channels the first means for communicating is communicating over via a first access point. The direct link setup message includes second channel information regarding one or more third communication channels the second means for communicating is capable of communicating over and one or more fourth communication channels the second means for communicating is communicating over via a second access point. The wireless apparatus further includes means for selecting at least one communication channel for communication based on the first channel information and the second channel information.

In another particular embodiment, a computer readable medium includes instructions that, when executed by a processor, cause the processor to store, at a first wireless apparatus, first channel information regarding one or more first communication channels the first wireless apparatus is capable of communicating over and one or more second communication channels the first wireless apparatus is communicating over via a first access point. The instructions further cause the processor to receive a direct link setup message from a second wireless apparatus as part of a process of forming a direct link between the first wireless apparatus and the second wireless apparatus. The direct link setup message includes second channel information regarding one or more third communication channels the second wireless apparatus is capable of communicating over and one or more fourth communication channels the second wireless apparatus is communicating over via a second access point. The instructions also cause the processor to select at least one communication channel for communication based on the first channel information and the second channel information.

In another particular embodiment, a method includes receiving, at a first station of a first basic service set including a first access point, channel information associated with a second station of a second basic service set including a second access point. The first basic service set is distinct from the second basic service set. The method also includes selecting a channel to establish a direct link between the first station and the second station based on the channel information associated with the second station. The method further includes sending at least one probe message to the second station via the selected channel and determining whether the direct link is established after sending the at least one probe message.

One particular advantage provided by disclosed embodiments is an ability to exchange channel information between STAs in different BSSs of an ESS, even when the STAs initially use different communication channels. For example, one or both of the STAs may change to a common communication channel when a direct link is desired. Another advantage is an ability to test a data rate associated with the common communication channel.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
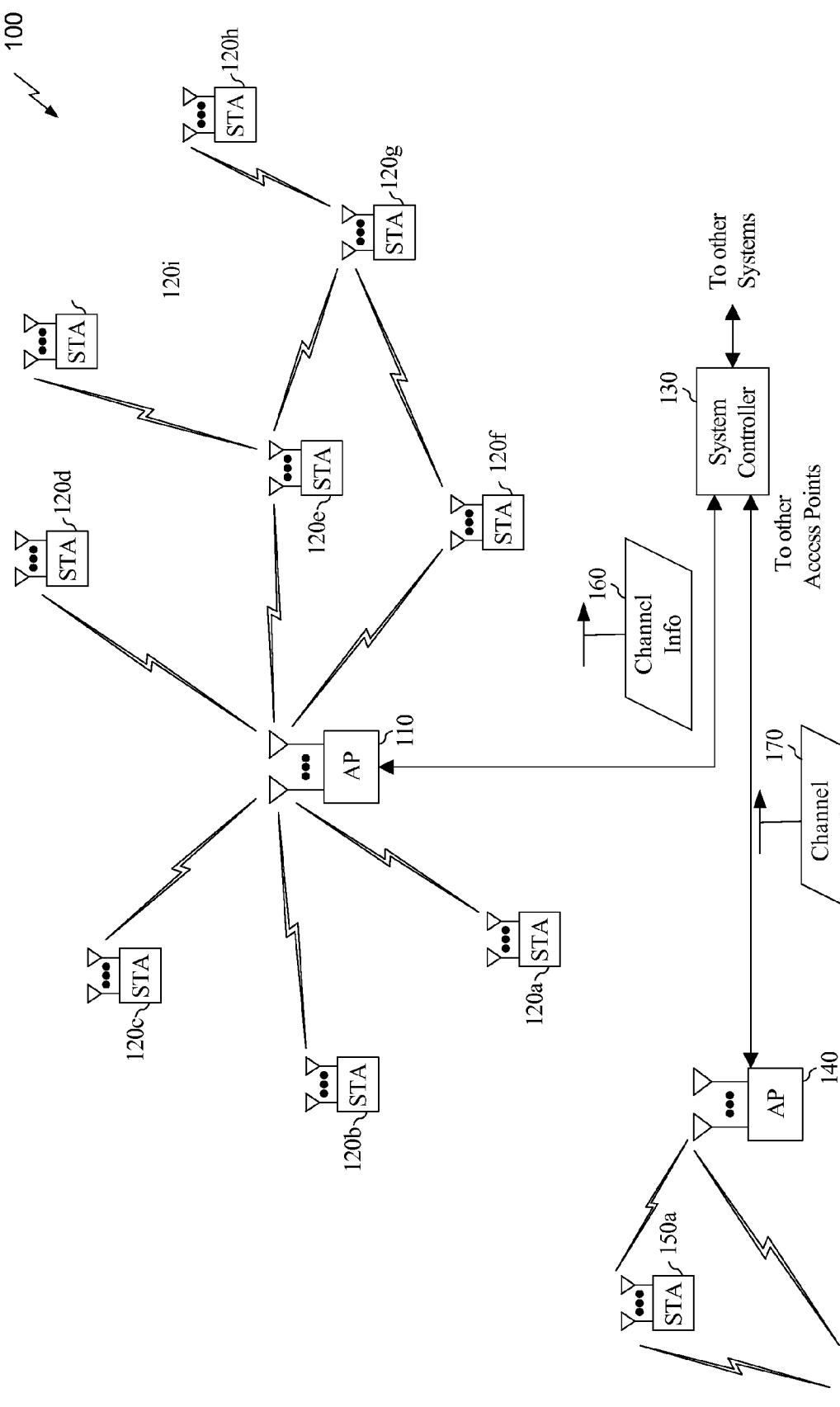
FIG. 1 is a diagram to illustrate a direct link setup through an extended service set (ESS) in a wireless system.

The techniques described herein may be used in combination with various wireless technologies such as code division multiple access (CDMA), orthogonal frequency division multiplexing (OFDM), time division multiple access (TDMA), and so on. Multiple user terminals (e.g., stations) can concurrently transmit and receive data via different orthogonal code channels for CDMA, time slots for TDMA, or sub-bands for OFDM. A CDMA system may implement IS-2000, IS-95, IS-856, Wideband-CDMA (W-CDMA), or some other standard. An OFDM system may implement one or more Institute of Electrical and Electronics Engineers (IEEE) 802.11 standards or some other standards. A TDMA system may implement global system for mobile communications (GSM) standards or some other standards.

Wireless network technologies may include various types of wireless local area networks (WLANs). A WLAN may be used to interconnect nearby devices together, employing various networking protocols. The various embodiments described herein may apply to any communication standard, such as wireless fidelity (Wi-Fi) or, more generally, any member of the IEEE 802.11 family of wireless protocols.

In some exemplary implementations, a WLAN may include various devices which are components that access the WLAN. For example, two types of devices that may access the wireless network include access points (APs) and clients (e.g., stations (STAs)). In general, an AP may serve as a hub or base station for the WLAN and a STA may serve as a user of the WLAN. The STA may connect to an AP via a Wi-Fi (e.g., an IEEE 802.11 protocol) compliant wireless link to obtain connectivity to the Internet or to other wide area networks. For example, the STA may include a communications device, a fixed location data unit, a mobile location data unit, a mobile phone, a cellular phone, a computer, a tablet, a portable computer (e.g., a laptop computer), a desktop computer, a personal digital assistant (PDA), etc. In some implementations, the STA may also be used and/or operate as the AP.

Wireless networks may operate in several modes, such as an infrastructure mode or an ad-hoc mode. During operation in the infrastructure mode, a STA may connect to an AP that serves as a hub for connecting one or more wireless clients (e.g., one or more STAs) to the network infrastructure, such as, for example, Internet access. In the infrastructure mode, the wireless network may use a client-server architecture to provide connectivity to the one or more wireless clients. During the ad-hoc mode, one or more wireless clients may establish direct connections to each other in a peer-to-peer architecture. In one aspect, an AP may generate a periodic beacon signal which broadcasts wireless network characteristics (e.g., a maximum data rate, an encryption status, an AP media access control (MAC) address, a service set identifier (SSID), etc.) to nearby clients (e.g., STAs). For example, the SSID may identify a particular wireless network.

A wireless device (e.g., a client or a station (STA)) associated with an infrastructure network may be referred to as an associated STA. The associated STA may directly communicate with another associated STA once a direct link is established. For example, the direct link may be established between two STAs in the same BSS or between two STAs in different BSSs of the same ESS. The direct link may be established using a wireless protocol (e.g. an IEEE 802.11 protocol) that defines a set up procedure to establish the direct link. One such protocol is a tunneled direct link setup (TDLS) protocol that may enable each of two different STAs to set up and establish the direct link.

FIG. 1 is a diagram to illustrate a particular embodiment of a system 100 to enable direct link setup through an extended service set (ESS) using channel information. The system 100 may include a wireless local area network (WLAN) system, such as a multiple-access WLAN system, including access points (APs) 110, 140 and stations (STAs) 120, 150. For simplicity, two access points, AP 110 and AP 140 are shown in FIG. 1. The APs 110, 140 may each be considered a device (e.g., a station or base station) that communicates with the STAs 120, 150. Each of the STAs 120, 150 may be referred to as a mobile station (MS), a station (STA), a client, or a wireless device. In a particular embodiment, one or more of the STAs 120, 150 may be a mobile STA or a fixed (e.g., stationary) STA.

The AP 110 may communicate with one or more STAs 120 (e.g., STAs 120*a-b*) at any given moment via a downlink or an uplink. The downlink (e.g., a forward link) may be a communication link from the AP 110 to a particular STA 120, and the uplink (e.g., a reverse link) may be a communication link from the particular STA 120 to the AP 110. The particular STA 120 may be associated with the AP 110 via a base channel that the particular STA 120 and the AP 110 communicate over. Each STA 120 may also communicate peer-to-peer with another STA 120, such as through the use of direct links. In a particular embodiment, the direct links are formed through a tunneled direct link setup (TDLS). For example, the TDLS may enable (e.g., allow) a particular STA to forward frames (e.g. one or more data frames) directly to another destination STA. The particular STA and the other destination STA may be included in the same basic service set (BSS) or in different BSSs as described further herein.

Similarly to the AP 110 and the STAs 120, the AP 140 may communicate with the STAs 150 (e.g., STAs 150*a-i*) and each of the STAs 150 may communicate peer-to-peer with another STA 150. The AP 140 may be similar in form and function as the AP 110. Further, the STAs 150 may be similar in form and function as the STAs 120. Accordingly, any description of the AP 110 and the STAs 120 may be similarly applied to the AP 140 and the STAs 150, respectively.

A set of the STAs 120 associated with the AP 110 may be referred to as a basic service set (BSS) of the AP 110. A particular BSS, therefore, refers to all STAs (e.g., the STAs 120) associated with a given AP (e.g., the AP 110). Accordingly, the set may include zero STAs (e.g., a null set), a single STA, or multiple STAs. Further, a set of the STAs 150 associated with the AP 140 may be referred to as a basic service set (BSS) of the AP 140.

The system 100 may also include a system controller 130. The system controller 130 may be coupled to and provide coordination and control for the APs 110, 140. In an alternative embodiment, the AP 110 and the AP 140 may communicate directly (e.g., via a direct connection). The system controller 130 may also provide and/or enable access to other systems, such as other networks or the Internet.

Multiple APs may be connected together to form an extended service set (ESS). For example, the AP 110 and the AP 140 may communicate with each other and, therefore, form an ESS. The ESS of the AP 110 and the AP 140 may include all of the STAs 120, 150 that communicate with the AP 110 and/or the AP 140. Accordingly, the ESS may include the STAs 120 and the STAs 150. Stated another way, the ESS may include a first STA in a first BSS that may communicate with a first AP using a first communication channel and a second STA in a second BSS that may communicate with a second AP using a second communication channel.

During operation of the system 100, a direct link (e.g., a TDLS link) may be established between two STAs (e.g., a first STA 120a and a second STA 120b) in the BSS of the AP 110 (e.g., a first AP 110). For example, the first STA 120a (e.g., an initiator STA) may discover other STAs in the same BSS as the first STA 120a. In a particular embodiment, the first STA 120a discovers the other STAs using a TDLS discovery process.

After discovering the other STAs, the first STA 120a may select a particular discovered STA (e.g., a discovered peer), such as the second STA 120b to setup the direct link (e.g., the TDLS link) in order to communicate directly. The first STA 120a (e.g., the initiator STA) may transmit (e.g., send) a setup request frame to the AP 110, which transmits (e.g., forwards) the setup request frame to the second STA 120b (e.g., a peer STA). The second STA 120b may respond to the setup request frame by transmitting a response message to the AP 110, which forwards the response message to the first STA 120a. In a particular embodiment, the response message may include a "SUCCESS" code. The first STA 120a may send a setup confirmation message to the AP 110, which forwards the setup confirmation message to the second STA 120b. In a particular embodiment, all of the messages between the first STA 120a and the second STA 120 are sent using AP links (e.g., uplinks and downlinks) via the AP 110. Accordingly, the direct link is formed between the first STA 120a and the second STA 120b that are in the same BSS.

The above described process to establish a direct link between two STAs in the same BSS may not be sufficient to allow STAs of different BSSs to form direct links (e.g., TDLS links) between one another. For example, the above process may not enable (e.g., permit or allow) the STA 120a of the BSS of the AP 110 to form a direct link with the STA 150a of the BSS of the AP 140.

To form a direct connection (e.g., a direct link) between the STA 120a and the STA 150a, one or both of the STA 120a and the STA 150a may need to switch to a different communication channel that is used by the other station (i.e., STA 120a or STA 150a). For example, the AP 110 and the AP 140 may form an ESS that includes the STA 120a and the STA 150a. In the ESS, the AP 110 may communicate with the STAs 120 using one or more communication channels that are different than one or more communication channels the AP 140 may use to communicate with the STAs 150. The STA 120a and the STA 150a may exchange channel information 160, 170 about one or more communication channels that each STA 120a, 150a is currently operating on. For example, the channel information 160, 170 may include one or more channel identifications (ID). Each channel ID may correspond to a particular frequency band (e.g., defined by one or more standards) over which data is communicated.

In some cases, the STA 120a and/or the STA 150a may be capable of operating on a communication channel that the other STA 120a and/or the STA 150a are not capable of operating (communicating) on. For example, the STA 120a may support communication on a first channel (e.g., a channel A), while the STA 150a is not capable of communication on the first channel (e.g., the channel A). However, the STA 120a and the STA 150a may both be capable of communication on a second channel (e.g., a channel B). Therefore, the STA 120a and the STA 150a may exchange information about one or more communication channels that each STA 120a, 150a is capable of operating on (e.g., that each STA supports) and/or not capable of operating on (e.g., that each STA does not support).

The exchange of the channel information (e.g., first channel information 160 and second channel information 170) may be used by one or both of the STA 120a and the STA 150a to facilitate communication and/or establishment of a direct link between the STA 120a and the STA 150a. For example, the STA 120a may transmit the first channel information 160 to the STA 150a via the AP 110 and the AP 140. The first channel information 160 may include information including one or more first communication channels (e.g., one or more first operation channel(s)) that the STA 120a is currently operating on (e.g., communicating over via the AP 110) and/or one or more second communication channels (e.g., one or more second operating channel(s)) that the STA 120a is capable of operating on. The first STA 120a may also store the first channel information. As another example, the STA 150a may transmit the second channel information 170 to the STA 120a via the AP 110 and the AP 140. The second channel information 170 may include information including one or more third communication channels (e.g., one or more third operation channel(s)) that the STA 150a is currently operating on (e.g., communicating over via the AP 140) and/or one or more fourth communication channels (e.g., one or more fourth operating channel(s)), that the STA 150a is capable of operating on.

In a particular embodiment, the first channel information 160 may be generated by the first AP 110 and provided to the STA 150a via the AP 140. In another particular embodiment, the second channel information 170 may be generated by the AP 140 and provided to the STA 120a via the AP 110. The channel information 160, 170 may be used to enable (e.g., allow) one or both of the STA 120a and the STA 150a to select an appropriate channel for use when establishing the direct link.

During operation of the system 100, a direct link (e.g., a TDLS link) may be established between two STAs (e.g., the STA 120a and the STA 150a) that are each included in different BSSs of the ESS.

In an exemplary embodiment, the STA 120a may discover (e.g., using one or more discovery protocols described herein) other STAs in the same ESS as the AP 110, which the STA 120a is associated with. After discovering the other STAs, the STA 120a (e.g., an initiator STA) may select a particular discovered STA (e.g., a peer STA), such as the second STA 150a to setup the direct link. To establish the direct link, the STA 120a and the STA 150a may engage in a direct link setup procedure (e.g., transmit and receive one or more messages) via one or both of the AP 110 and the AP 140. One or both of the STA 120a and the STA 150a may also exchange channel information with the other STA, respectively. For example, the STA 120*a* may transmit the channel information 160 to the STA 150*a*. As another example, the STA 150*a* may transmit the channel information 170 to the STA 120*a*.

The STA 120*a* and the STA 150*a* may use the channel information 160, 170 to select a particular communication channel with which to attempt to establish a direct link. After the particular communication channel is selected, establishment of the direct link between the STA 120*a* and the STA 150*a* may be confirmed using a probe message (e.g., a beacon message), an acknowledgment message, or a combination thereof. For example, after the particular communication channel is selected, the STA 150*a* may transmit the probe message via the particular communication channel to the STA 120*a*. In response to receiving the probe message, the STA 120*a* may transmit the acknowledge message via the particular communication channel to the STA 150*a*. In a particular embodiment, the STA 150*a* may transmit the probe message and the STA 120 may transmit the acknowledge message. After confirmation that the direct link is established (e.g., via the particular communication channel), the STA 120*a* and the STA 150*a* may communicate via the direct link.

Accordingly, the direct link is formed between the STA 120*a* of the BSS of the AP 110 and the STA 150*a* of the BSS of the AP 140. By exchanging the first channel information 160 and/or the second channel information 170, each of the STA 120*a* and the STA 150*a* may be aware of one or more communication channels used and/or accessible to the other STA. Accordingly, the STA 120*a* and the STA 150*a* of different BSSs may be able to select a particular channel with which to establish a direct link based on an exchange of at least one of the first channel information 160 and the second channel information 170.

Figure 2:
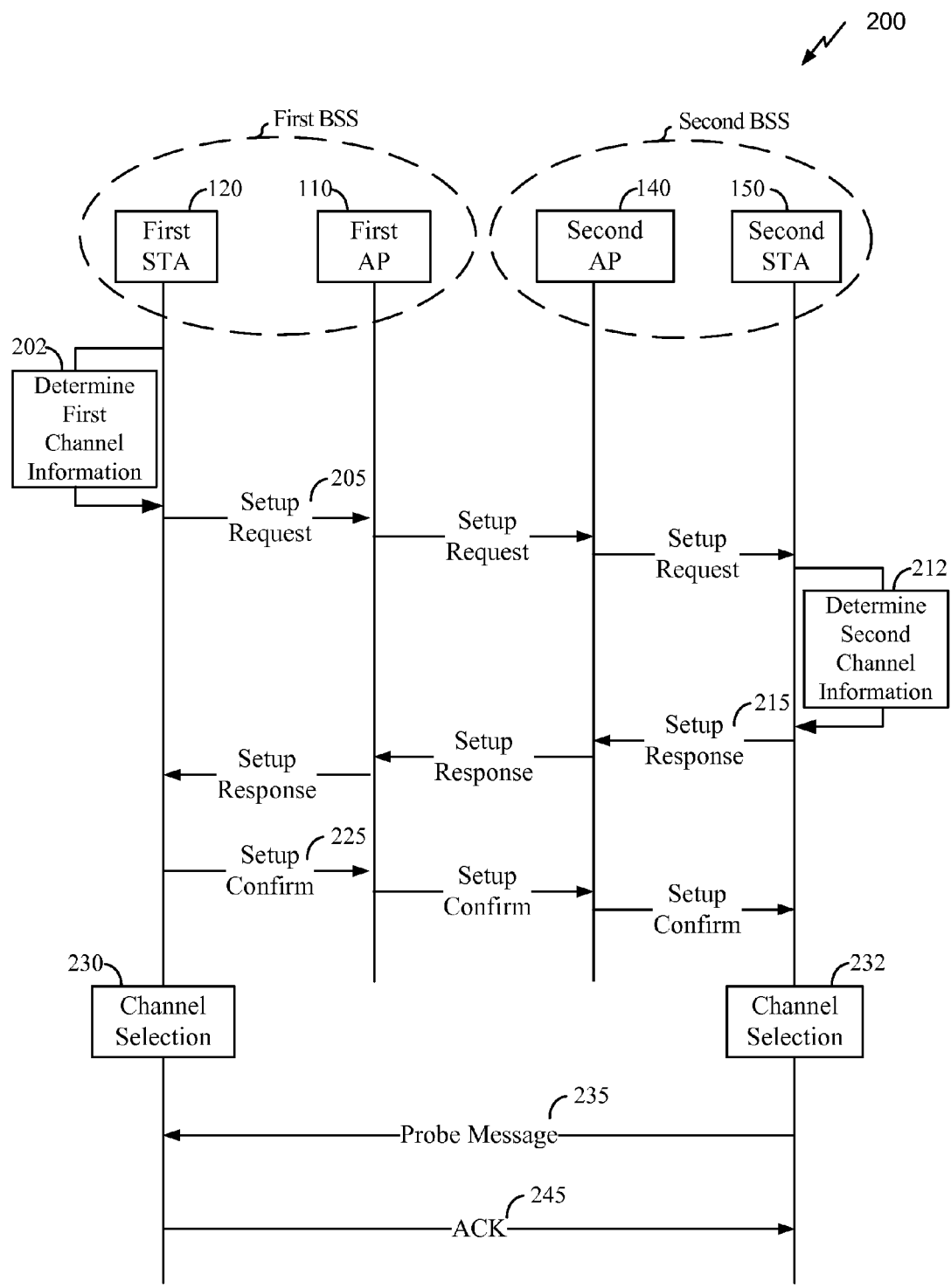
FIG. 2 is a ladder diagram of an illustrative embodiment of a process for establishing a direct link in an ESS including multiple a access points.

FIG. 2 shows a ladder diagram 200 of an exemplary process (e.g., a method) for establishing a direct link between two STAs in an ESS. The ESS may include a first BSS associated with the first AP 110 and a second BSS associated with the second AP 140. In a particular embodiment, the ESS includes more than two APs. The first BSS may include the first STA 120 and the second BSS may include the second STA 150. The first STA 120 may be associated with the first AP 110 over one or more first base channels and the second STA 150 may be associated with the second AP 140 over one or more second base channels. In a particular embodiment, at least one first base channel is a different channel than the one or more second base channels. For example, the first STA 120 and the second STA 150 may include one of the STAs 120*a-b* and one of the STAs 150*a-i* of FIG. 1, respectively.

The first STA 120 may discover other STAs in the same ESS as the first STA 120, through a discovery process. The discovery process used by the first STA 120 may be different than a TDLS discovery process. For example, the discovery process may utilize a discovery mechanism that includes a layer 2 protocol (e.g. a data link layer protocol), a layer 3 protocol (e.g., a network layer protocol), or a combination thereof. As used herein, the term "layer N" may refer to the Nth layer of the Open Systems Interconnection (OSI) model, in which layers 1-7 may alternately be referred to as physical layer, data link layer, network layer, transport layer, session layer, presentation layer, and application layer, respectively. In a particular embodiment, the discovery mechanism may include a discovery protocol including Bonjour, universal plug and play (UPnP), or zero-conf based protocols. In another particular embodiment, the discovery mechanism may be a generic advertisement service (GAS) server protocol.

The first STA 120 may select one or more of the other STAs with which to set up a direct link (e.g., a TDLS link) in order communicate directly. For example, the first STA 120 may select the STA 150 (e.g., a particular peer STA) with which to set up the direct link. The decision by the first STA 120 to establish the direct link with the second STA 150 may be made based on an application, such as a higher layer application (e.g., a file sharing application or an audio visual application), running on the second STA 150. The first STA 120 may have received information associated with the application of the second STA 150 as part of, or in conjunction with, the discovery mechanism associated with the discovery process.

The first STA 120 may determine first channel information associated with the first STA 120, at 202. The first channel information may include information regarding the communication channel(s) the first STA 120 is currently operating on and/or capable of operating on. The first STA 120 may be configured to identify what channels the first STA 120 is communicating on via the first AP and what channels the first STA 120 is capable of operating on. For example, the first channel information may include the channel information 160 of FIG. 1.

The first STA 120 may transmit a setup request 105 (e.g., a TDLS setup request frame) to the second STA 150. The setup request 105 may be transmitted to the second STA 150 via the first AP 110 and the second AP 140. In a particular embodiment, the setup request 105 may also be transmitted to the second STA 150 via a system controller, such as the system controller 130 of FIG. 1. The setup request 105 may include the first channel information associated with the first STA 120 and the second STA may store the first channel information for later use.

The second STA 150 may receive the setup request 105 and determine second channel information associated with the second STA 150, at 212. The second channel information may include information regarding the communication channel(s) the second STA 150 is currently operating on and/or capable of operating on. For example, the first channel information may include the channel information 170 of FIG. 1.

The second STA 150 may transmit a setup response 215 (e.g., a TDLS response message) to the first STA 120. In a particular embodiment, the response message 215 may include a "SUCCESS" code. The setup response may be transmitted to the second STA 150 via the first AP 110 and the second AP 140. The setup response 215 may include the second channel information associate with the second STA 150 and the first STA 120 may store the second channel information for later use.

The first STA 120 may receive the setup response 215 and respond by sending a setup confirmation 225 (e.g., a TDLS setup confirmation message) to the second STA 150. The setup confirmation 225 may be transmitted to the second STA 150 via the first AP 110 and the second AP 140. Accordingly, after the exchange described above, the first STA 120 and the second STA 150 may each have (e.g., store) channel information for both the first STA 120 and the second STA 150. The STA 120 and the STA 150 may utilize the stored channel information to select the appropriate channel with which to establish a direct link.

The first STA 120 and the second STA 150 may perform channel selection 230, 232, respectively, based on the first channel information and the second channel information. The channel selection 230, 232 may select an appropriate channel (e.g., one or more communication channels) with which to establish the direct link. The channel selection 230 performed by the first STA 120 and the channel selection 232 performed by the second STA 150 may be complimentary or coordinated so that each of the first STA 120 and the second STA 150 may independently select the same communication channel(s) with which to establish the direct link. One or more processes or algorithms (e.g., methods) may be employed by either of the first STA 120 or the second STA 150 to select the appropriate channel. Channel selection 230, 232 may be performed based on identification of one of the first STA 120 and the second STA 150 as the initiator STA (e.g., a TDLS initiator) and/or the peer STA (e.g., a TDLS responder). Identification of the initiator STA and/or the peer STA may be performed by either of the first STA 120 and/or the second STA 150. Identification of the initiator STA and/or the peer STA may be used by the channel selection 230, 232 as a way to decide which channel set (e.g., the one or more first communication channels and/or the one or more second communication channels of the first STA 1120 or the one or more third communication channels and/or the one or more fourth communication channels of the second STA 150) is used as a reference set when making a determination of which channel(s) to select for use in direct link communication. For example, when the first STA 120 is identified as the initiator STA, the one or more first communication channels and/or the one or more second communication channels may be selected as the reference set. In a particular embodiment, when the one or more first communication channels of the first STA 120 (e.g., the initiator STA) are selected as the reference set, a determination may be made whether the reference set (e.g., the one or more first communication channels) includes at least one communication channel of the one or more fourth communication channels of the second STA 150.

In a particular embodiment, the channel selection 230, 232 may select at least one communication channel for communication directly between the first STA 120 (e.g., a first wireless apparatus) and the second STA 150 (e.g., a second wireless apparatus) based on the first channel information and the second channel information. In a first exemplary embodiment of the exemplary process of FIG. 2, if the first STA 120 does not support the current operating channel of the second STA 150 but the second STA 150 supports the current operating channel of the first STA 120, then the second STA 150 switches to the operating channel of the first STA 120. In a second exemplary embodiment, if the second STA 150 does not support the current operating channel of the first STA 120 but the first STA 120 supports the current operating channel of the second STA 150, then the first STA 120 switches to the operating channel of the second STA 150.

In a third exemplary embodiment of the exemplary process of FIG. 2, if both the first STA 120 and the second STA 150 support the other STA's current operating channel, then the first STA 120 switches to the current operating channel of the second STA 150 because the first STA 120 is the initiator STA (e.g., the TDLS initiator). In a fourth exemplary embodiment, if both the first STA 120 and the second STA 150 support the other STA's current operating channel, then the second STA 150 switches to the current operating channel of the first STA 120 because the second STA 150 is the peer STA (e.g., a TDLS responder).

In a fifth exemplary embodiment of the exemplary process of FIG. 2, if neither of the first STA 120 nor the second STA 150 supports the other STA's current operating channels, the first STA 120 and the second STA 150 select a channel each is capable of operating on. The selection in the fifth exemplary embodiment may be done by a priority that is stored in the first STA 120 and the second STA 150 (e.g., in accordance with an industry standard), by some shared algorithm, by a priority shared in a message, such as one of the messages described above or a different message, or some other technique.

In a sixth exemplary embodiment of the exemplary process of FIG. 2, at least one of the one or more second communication channels may be selected as the at least one communication channel when the first communication channels do not include at least one of the one or more fourth communication channels. In a seventh exemplary embodiment, at least one of the one or more fourth communication channels may be selected as the at least one communication channel when the one or more third communication channels do not include at least one of the one or more second communication channels.

In an eighth exemplary embodiment of the exemplary process of FIG. 2, at least one of the one or more second communication channels may be selected as the at least one communication channel when the first STA 120 initiated a direct link setup (e.g., a TDLS direct link setup). In a ninth exemplary embodiment, at least one of the one or more second communication channels may be selected as the at least one communication channel when the second STA 150 initiated a direct link setup (e.g., a TDLS direct link setup). In a tenth exemplary embodiment, at least one of the one or more fourth communication channels may be selected as the at least one communication channel when the second STA 150 initiated a direct link setup (e.g., a TDLS direct link setup). In an eleventh exemplary embodiment, at least one of the one or more fourth communication channels may be selected as the at least one communication channel when the first STA 120 initiated a direct link setup (e.g., a TDLS direct link setup). It will be appreciated that other selection methods may also be used to select the at least one communication channel. As such, the examples to select the at least one communication channel included herein are exemplary are not to be considered exhaustive.

In a particular embodiment, prior to switching from a channel with an associated AP to another channel associated a direct link, the first STA 120 or the second STA 150 may enter power save (e.g., a power save mode) with the first AP 110 and the second AP 140, respectively. For example, the first STA 120 entering the power save mode with the first AP 110 may notify the first AP 110 that the first STA 120 is entering the power save mode or request the first AP 110 for permission to enter the power save mode. After receiving a notification or a request, the first AP 110 may consider (e.g., treat) the first STA 120 as if the first STA 120 were in the power save mode (e.g., a sleep mode). In a particular embodiment, after the first AP 110 receives the notification or the request, the first AP 110 may transmit any data (e.g., buffered data) at the first AP 110 that is designated for the first STA 120 prior to considering the first STA 120 in the sleep mode. While the first AP 110 considers the first STA 120 as being in the power save mode, the first STA may not actually be in the power save mode, but may be in an active mode and engaged in communication with the second STA 150 via a direct link over the other channel associated with the direct link. When the first AP 110 considers the first STA 120 in the sleep mode and wants to transmit data to the first STA 120, the first AP 110 will notify (e.g., attempt to wake) the first STA 120.

After the appropriate channel is selected, the second STA 150 may transmit a probe message 235 (e.g., a NULL frame) directly to the first STA 120 using the selected channel to determine whether or not the direct link is successfully formed. The probe message 235 is not transmitted via either the first AP 110 or the second AP 140. The first STA 120 may determine a direct link is successfully formed based on receipt of the probe message 235. In response to receiving the probe message 235, the first STA 120 may transmit an acknowledgement message (ACK) 245 to the second STA 150 over the direct link on the selected channel. The second STA 150 may determine that a direct link is successfully formed based on receipt of the ACK 245 and communicate over the direct link.

In a particular embodiment, if the first STA 120 determines that the probe message is not received or the second STA 150 determines that the ACK message 245 is not received, the first STA 120 or the second STA 150 may reattempt setup of the direct link using a different channel. In a particular embodiment, if the first STA 120 determines the probe message is not received or the second STA 150 determines the ACK message 245 is not received, the STA 120 and the second STA 150 communicate via at least one of the first AP 110 and the second AP 140.

In another particular embodiment, one or more probe messages may be sent over the selected channel at different rates to test a direct connection between the first STA 120 and the second STA 150. For example, the second STA 150 may transmit multiple probe messages to the first STA 120, where each probe message is transmitted at a different rate. When the first STA 120 receives a particular probe message, the first STA 120 may then transmit the ACK message 245 to the second STA 150 at a rate (e.g., a data rate) that corresponds to a rate with which the particular probe message was transmitted.

In another particular embodiment, the channel selection 230, 232 may select multiple communication channels for communication based on the first channel information and the second channel information. A particular STA may transmit a probe message over each of the multiple communication channels until an acknowledge message is received. For example, a first channel and a second channel may be selected for communication and the second STA 150 may transmit a first probe message to the first STA 120 over the first channel. As another example, one or more first probe messages may each be sent at different rates from the second STA 150 to the first STA 120. If the second STA 150 does not receive an acknowledge message in response to the first probe message, the second STA 150 may send a second probe message over the second channel. In a particular embodiment, if the second STA 150 does not receive an acknowledge message in response to the second probe message, the second STA 150 stops sending probe messages and instead communicates with the first STA 120 via the first AP 110 and the second AP 140. In another particular embodiment, if the second STA 150 does not receive an acknowledge message in response to either of the first probe message or the second probe message, the second STA 150 may reattempt sending probe messages via the first channel and the second channel.

The selected channel for the direct link may be periodically switched by one or both of the first STA 120 and the second STA 150. For example, the direct link may be periodically switched between the first base channels of the first STA 120 and the second base channels the second STA 150. In a particular embodiment, to switch an operating channel of the direct link, the first STA 120 transmits a channel switch request (e.g., a TDLS channel switch request) to the second STA 150 and the second STA 150 responds with a channel switch response (e.g., a TDLS channel switch response). The first STA 120 may transmit the channel switch request to the second STA 150 via the selected channel of the direct link. Alternatively, the first STA 120 may send the channel switch request via at least one of the first AP 110 and the second AP 140. In another particular embodiment, the second STA 150 may transmit the channel switch request to the first STA 110 and the first STA 110 may transmit the channel switch response.

In a particular embodiment, when the selected channel used to establish the direct link includes a base channel of the first STA 120, the first STA 120 may initiate the channel switch to another base channel (e.g., a subsequent base channel) of the first STA 120. In another particular embodiment, when the selected channel used to establish the direct link includes a base channel of the first STA 120, the second STA 150 may initiate the channel switch to another channel. For example, the second STA 150 may initiate the channel switch to another base channel of the first STA 120 or to a base channel of the second STA 150 that the first STA 120 is capable of communicating over.

When the selected channel used to establish the direct link between two STAs includes a base channel of a particular STA of the two STAs, the particular STA may exit power save mode with an associated AP, may exchange traffic with the particular AP, may receive one or more beacons, or a combination thereof. The particular STA may also enter power save (e.g., a power save mode) with the particular AP prior to transmitting a channel switch request (e.g., a TDLS channel switch request frame) or a channel switch response (e.g., a TDLS channel switch response frame). Alternatively, the other STA may enter power save (e.g., a power save mode) with another AP prior to switching to another channel. For example, prior to switching to another channel, the first STA 120 or the second STA 150 may enter power save with the AP 110 and the AP 140, respectively.

Accordingly, in the ESS including the first BSS and the second BSS, the direct link may be established between the first STA 120 and the second STA 150. For example, the first STA 120 and the second STA 150 may exchange channel information to select a communication channel to be used as the direct link to be established. One or both of the first STA 120 or the second STA 150 may transmit a probe message and/or an acknowledge message to test the selected channel prior to using the selected channel for the direct link. After the selected communication is sufficiently tested, the selected channel may be used as the direct link to enable the first STA 120 and the second STA 150 to communicate directly.

Figure 3:
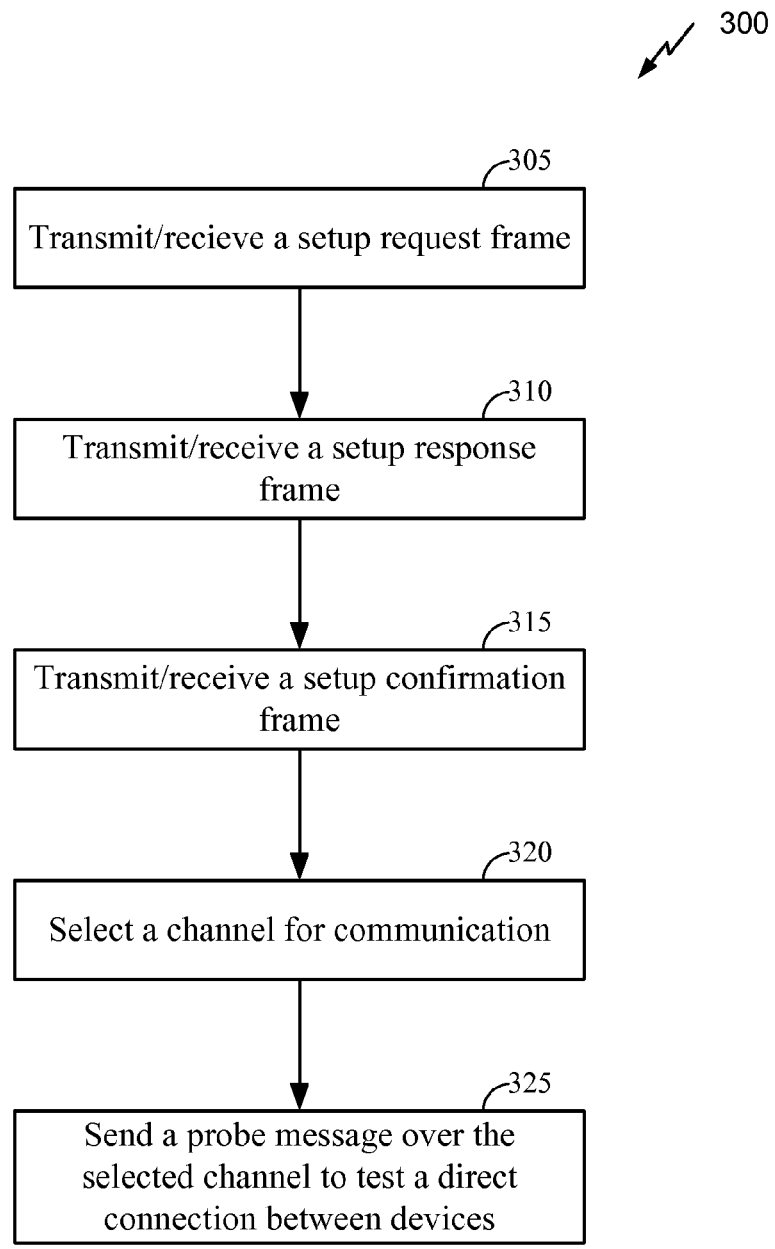
FIG. 3 is a flow diagram of a first illustrative embodiment of a method for setting up a direct link between a first station (STA) and a second STA in the same ESS.

Referring to FIG. 3, a flow diagram of a first illustrative embodiment of a method 300 to enable direct link setup through an extended service set (ESS) using channel information is depicted. For example, a direct link may be established between two STAs in the same ESS. In a particular embodiment, the two STAs are included in different BSSs.

A setup request frame may be transmitted/received, at 305. A first STA (e.g., an initiator STA) of a first BSS of a first AP may transmit the setup request frame to a second STA (e.g., a peer STA) of a second BSS of a second AP. The setup request frame (e.g., a setup request message) may include first channel information. For example, the setup request frame may include the setup request 205 of FIG. 2. The first channel information may include information regarding the communication channel(s) the first STA is currently operating on and/or information about the communication channel(s) the first STA is capable of operating on. The second STA may receive the setup request frame from the first STA via the first AP and the second AP. The second STA may also receive and store the first channel information associated with the first STA. For example, the first STA may include any of the STAs 120 of FIGS. 1-2 and the second STA may include any of the STAs 150 of FIGS. 1-2.

A setup response frame may be transmitted/received, at 310. The second STA may transmit the setup response frame (e.g., a setup response message) to the first STA via the first AP and the second AP. For example, the setup response frame may include the setup response 215 of FIG. 2. The setup response frame may include second channel information. The second channel information may include information regarding the communication channel(s) the second STA is currently operating on and/or information about the communication channel(s) the second STA is capable of operating on. The first STA may receive the setup response frame from the second STA via the first AP and the second AP. The first STA may also receive and store the second channel information associated with the second STA. For example, the first STA, the first AP, the second STA, and the second AP may include the STAs 120, the AP 110, the STAs 150, and the AP 140 of FIGS. 1-2, respectively.

A setup confirmation frame may be transmitted/received, 315. The first STA may transmit the setup confirmation frame (e.g., a setup confirmation message) to the second STA. For example, the setup confirmation frame may include the setup confirmation 225 of FIG. 2. The second STA may receive the setup confirmation frame via the first AP and the second AP.

A channel for communication may be selected, at 320. Based on the messages received at each of the STA and the second STA, one or both of the first STA and the second STA may select a channel with which to establish the direct link. The channel may be selected based at least in part on the first channel information, the second channel information, or a combination thereof. For example, the first channel information and the second channel information may include the first channel information 160 and the second channel information 170 of FIG. 1.

A probe message may be sent over the selected channel to test a direct connection between devices, at 325. The probe message may be sent over the select channel to test for communication (e.g., connectivity) via the selected channel and/or to test a data rate associated with the selected channel (e.g., a selected communication channel). One of the first STA and the second STA may transmit (e.g., send) the probe message to the other STA via the selected channel. The other STA may receive the probe message transmitted over the selected channel and respond with an acknowledgment message. Accordingly, the first STA and/or the second STA may determine whether the direct link is established after the probe message is transmitted. In a particular embodiment, the first STA transmits the probe message to the second STA and, in response to receiving the probe message, the second STA transmits the acknowledgment message to the first STA.

In a particular embodiment, depending on the data rate of the selected channel, the first STA and the second STA may use the selected channel for the direct link and communicate via the selected channel. If the data rate of the selected channel is determined to be insufficient (e.g., as compared to a threshold data rate or a data rate via an alternate communication path that is not the direct link), the first STA and the second STA may try a different channel. In a particular embodiment, when the selected channel is insufficient, the first STA and the second STA may forego the direct link and communicate via one or more of the first AP and the second AP. Use of the probe message (e.g., one or more probe messages) is described further with reference to FIG. 5.

Accordingly, in an ESS, channel information may be exchanged between the first STA of the first BSS and the second STA of the second BSS. One or both of the first STA and the second STA may change to a selected (e.g., common) channel (e.g., a communication channel) when a direct link is desired. Further, a probe message may be transmitted via the common communication channel to test a data rate associated with the common communication channel. Thus, the direct link may be established and verified between the first STA and the second STA.

Figure 4:
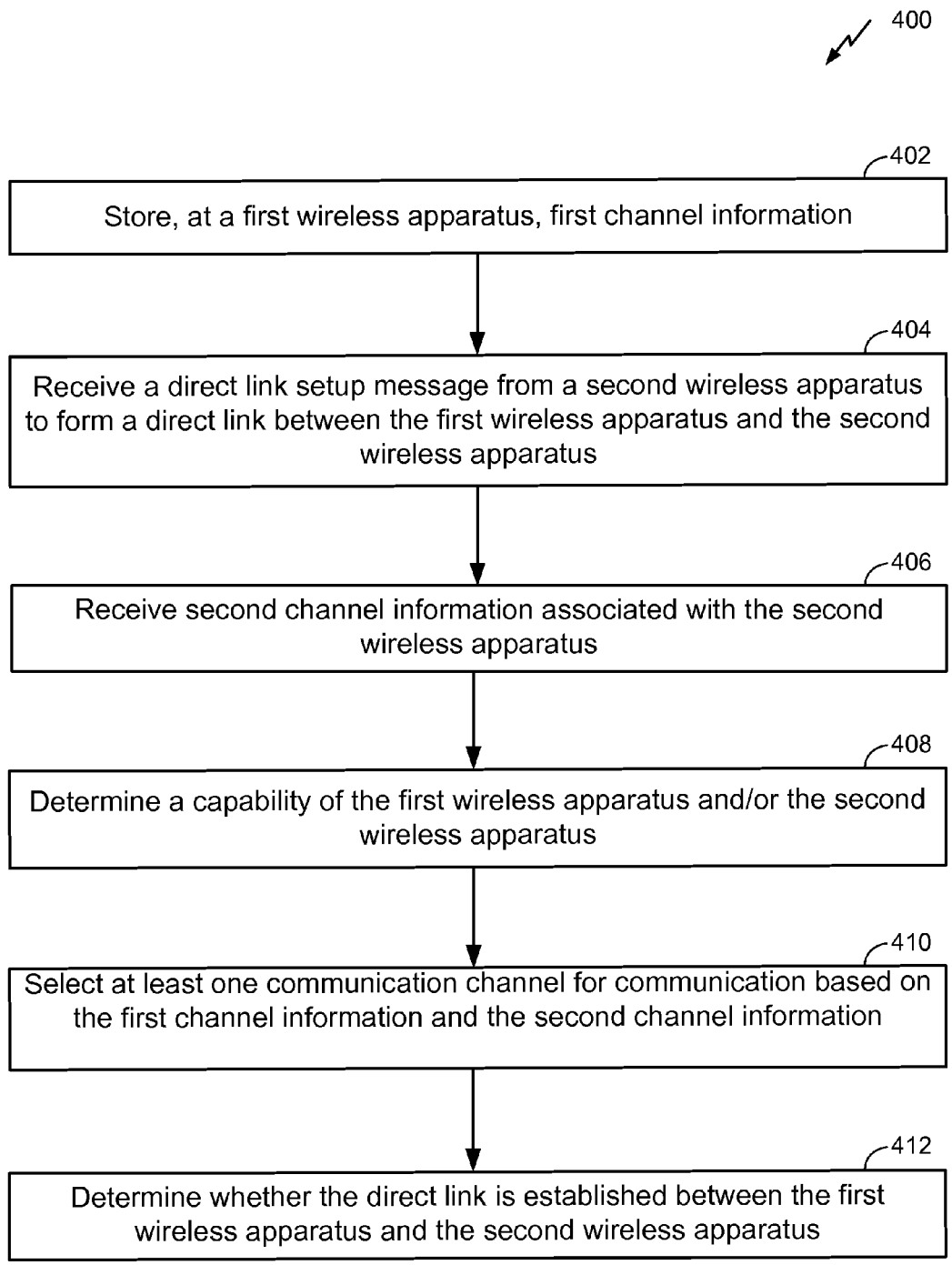
FIG. 4 is a flow diagram of a second illustrative embodiment of a method for setting up a direct link between a first STA and a second STA in the same ESS.

Referring to FIG. 4, a flow diagram of a second illustrative embodiment of a method 400 to enable direct link setup through an extended service set (ESS) using channel information is depicted. At a first wireless apparatus, first channel information may be stored, at 402. The first wireless apparatus (e.g., a first STA) may be associated with a first AP and included in a first BSS of the first AP. The first wireless apparatus may determine the first channel information at the first wireless apparatus or receive the first channel information from the first AP. The first wireless apparatus may store the first channel information at a memory associated with the first wireless apparatus. The first channel information may be related to one or more first communication channels the first wireless apparatus is capable of communicating over, and one or more second communication channels the first wireless apparatus is communicating over via the first AP. For example, the one or more first communication channels that the first wireless apparatus is capable of communicating over may include channels 1-10 and the one or more second communication channels that the first wireless apparatus is communicating over via the first AP may include channels 3 and 6. For example, the first channel information may include the channel information 160 of FIG. 1 and the first wireless apparatus may include any of the STAs 120 of FIGS. 1-2.

A direct link setup message to form a direct link between the first wireless apparatus and a second wireless apparatus may be received from the second wireless apparatus, at 404. The second wireless apparatus (e.g., a second STA) may be associated with a second AP and included in a second BSS of the second AP. The first AP and the second AP may be included in an extended service set (ESS) and the first BSS may be distinct from the second BSS. The first wireless apparatus may receive the direct link setup message transmitted by the second wireless apparatus via at least one of the first AP and the second AP. For example, the second wireless apparatus may include any of the STAs 150 of FIGS. 1-2.

Second channel information associated with the second wireless apparatus may be received, at 406. The first wireless apparatus may receive the second channel information via at least one of the first AP or the second AP. The first wireless apparatus may store the received second channel at the memory associated with the first wireless apparatus. The second channel information may be related to one or more third communication channels the second wireless apparatus is capable of communicating over and one or more fourth communication channels the second wireless apparatus is communicating over via the second AP. For example, the one or more third communication channels that the second wireless apparatus is capable of communicating over may include channels 2, 4, 6, 8, and 10 and the one or more fourth communication channels that the second wireless apparatus is communicating over via the second AP may include channels 6 and 10. The one or more second communication channels of the first wireless apparatus are different than the one or more fourth communication channels of the second wireless apparatus. For example, a set of communication channels that the first wireless device is communicating over via the first AP (e.g., channels 3 and 6) may be a different set of channels than a set of communication channels that the second wireless apparatus is communicating over via the second AP (e.g., channels 6 and 10). In a particular embodiment, the one or more second communication channels include at least one particular communication channel that is different than any of the one or more fourth communication channels. Stated another way, a set of channels that make up the one or more second communication channels may be a different set than a set of channels that make up the one or more fourth communication channels. For example, when the first wireless apparatus is communicating over channels 3 and 6 via the first AP and the second wireless apparatus is communicating over channels 6 and 10 via the second AP, the first wireless apparatus is communicating over channel 3, which is a different channel than channels 6 and 10 with which the second wireless apparatus is communicating over via the second AP. In another particular embodiment, each of the one or more second communication channels is different than any of the one or more fourth communication channels.

In a particular embodiment, the channel information associated with the second wireless apparatus may be included in the direct link setup message. For example, the first channel information may include the channel information 170 of FIG. 1. The second channel information may be determined by the second wireless apparatus, the second AP, or a combination thereof.

A capability of the first wireless apparatus and/or the second wireless apparatus may be determined, at 408, and at least one communication channel for communication may be selected based on the first channel information and the second channel information, at 410. The capability of the first wireless apparatus may include a capability of a transceiver of the first wireless apparatus, and a capability of the second wireless apparatus may include a capability of a transceiver of the second wireless apparatus. For example, determining the capability of the first wireless apparatus may include determining whether the first transceiver is capable of communicating on one of the one or more communication channels that the second transceiver is capable of communicating over and/or at least one of the one or more communication channels that the second transceiver is communicating over via the second access point. Determining the capability of the second wireless apparatus may include determining whether the second transceiver is capable of communicating on one of the one or more communication channels that the first transceiver is capable of communicating over and/or at least one of the one or more communication channels that the first transceiver is communicating over via the second access point.

Selecting the at least one communication channel may include determining whether the first wireless apparatus is capable of communicating over at least one of the one or more third communication channels and/or determining whether the second wireless apparatus is capable of communicating over at least one of the one or more fourth communication channels.

In a particular embodiment, selecting the at least one communication channel may include determining whether the second wireless apparatus is capable of communicating over at least one of the one or more first communication channels and/or determining whether the second wireless apparatus is capable of communicating over at least one of the one or more second communication channels. In another particular embodiment, selecting the at least one communication channel may include determining whether a particular channel is included in both the one or more first communication channels and the one or more third communication channels and selecting the particular channel as the at least one communication channel.

In a first exemplary embodiment of the method 400, at least one of the one or more second communication channels may be selected as the at least one communication channel based on determining that the second wireless apparatus is capable of communicating over at least one of the one or more second communication channels. For example, when the second wireless apparatus is capable of communicating over channels 2, 4, 6, 8, and 10 and the first wireless apparatus is communicating over channels 3 and 6 via the first AP, at least one of channels 3 and 6 may be selected as the at least one communication channel.

In a second exemplary embodiment of the method 400, at least one of the one or more fourth communication channels may be selected as the at least one communication channel based on determining that the second wireless apparatus is not capable of communicating over at least one of the one or more second communication channels. For example, when the second wireless apparatus is not capable of communicating over at least one of channels 3 and 6 that the first wireless apparatus is communicating over via the first AP, at least one of channels 6 and 10 may be selected as the at least one communication channel.

In a third exemplary embodiment of the method 400, at least one of the one or more first communication channels may be selected as the at least one communication channel based on determining that the second wireless apparatus is capable of communicating over at least one of the one or more first communication channels. For example, when the second wireless apparatus is capable of communicating over channels 2, 4, 6, 8, and 10 and the first wireless apparatus is capable of communicate over channels 1-10, at least one of channels 1-10 may be selected as the at least one communication channel. In a particular embodiment, one of channels 2, 4, 6, 8, and 10 may be selected as the at least one communication channel.

In a fourth exemplary embodiment of the method 400, at least one of the one or more third communication channels may be selected as the at least one communication channel based on determining that the second wireless apparatus is not capable of communicating over at least one of the one or more first communication channels. For example, when the second wireless apparatus is not capable of communicating over at least one of channels 1-10 that the first wireless apparatus is capable of communicating over, at least one of channels 2, 4, 6, 8, and 10 may be selected as the at least one communication channel.

In a fifth exemplary embodiment of the method 400, at least one of the one or more second communication channels may be selected as the at least one communication channel based on determining that the second wireless apparatus is capable of communicating over at least one of the one or more second communication channels and/or that the first wireless apparatus is capable of communicating over at least one of the one or more fourth communication channels. For example, when the second wireless apparatus is capable of communicating over channels 2, 4, 6, 8, and 10 and the first wireless apparatus is communicating over channels 3 and 6 via the first AP, at least one of channels 3 and 6 may be selected as the at least one communication channel. As another example, when the first wireless apparatus is capable of communicating over channels 1-10 and the second wireless apparatus is communicating over channels 6 and 10 via the second AP, at least one of channels 3 and 6 may be selected as the at least one communication channel.

In a sixth exemplary embodiment of the method 400, at least one of the one or more fourth communication channels may be selected as the at least one communication channel based on determining that the first wireless apparatus is capable of communicating over at least one of the one or more fourth communication channels and/or that the second wireless apparatus is capable of communicating over at least one of the one or more second communication channels. For example, when the first wireless apparatus is capable of communicating over channels 1-10 and the second wireless apparatus is communicating over channels 6 and 10 via the second AP, at least one of channels 6 and 10 may be selected as the at least one communication channel. As another example, when the second wireless apparatus is capable of communicating over channels 2, 4, 6, 8, 10 and the first wireless apparatus is communicating over channels 3 and 6 via the first AP, at least one of channels 6 and 10 may be selected as the at least one communication channel.

Whether a direct link is established between the first wireless apparatus and the second wireless apparatus may be determined, at 412. One or both of the first wireless apparatus and the second wireless apparatus may transmit a probe message over the selected channel to test a direct connection and verify establishment of the direct link. A response (e.g., an acknowledge message) may be transmitted, to the wireless apparatus that sent the probe message. Based on the exchange of the probe message and the response (e.g., the acknowledge message), both the first wireless apparatus and the second wireless apparatus may determine whether the direct link is established.

Accordingly, the first wireless apparatus of the first BSS and the second wireless apparatus of the second BSS may exchange channel information to enable establishment of the direct link. Based on the exchanged channel information, a particular channel may be selected to be used for the direct link. Thus, the direct link may be established between the first wireless apparatus and the second wireless apparatus.

Figure 5:
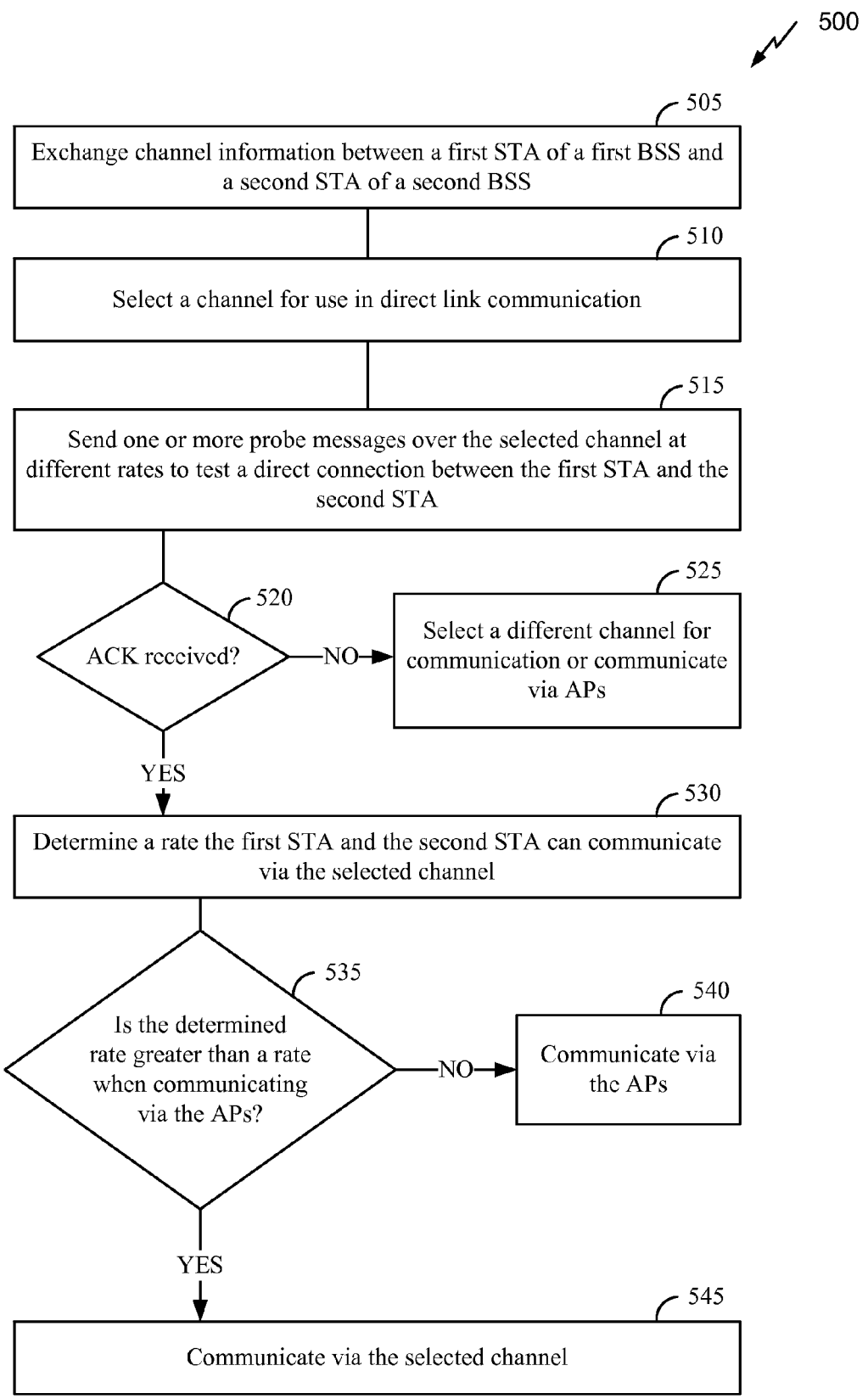
FIG. 5 is a flow diagram of a third illustrative embodiment of a method for setting up a direct link between a first STA and a second STA in the same ESS.

Referring to FIG. 5, a flow diagram of a third illustrative embodiment of a method 500 to enable direct link setup through an extended service set (ESS) using channel information is depicted. The method 500 may include exchanging channel information between a first STA of a first BSS and a second STA of a second BSS, at 505. For example, the first STA and the second STA may include the STAs 120 and the STAs 150 of FIGS. 1-2, respectively.

A channel may be selected for use in the direct link communication, at 510. The channel may be selected based on the channel information, such as information regarding the communication channel(s) that the first STA and the second STA are currently operating on and/or capable of operating on. For example, the selected channel may be the channel the first STA is currently operating on when the first STA does not support a current operating channel of the second STA, but the second STA supports the current operating channel of the first STA. In another example, the selected channel may be the channel the second STA is currently operating on when the second STA does not support a current operating channel of the first STA, but the first STA supports the current operating channel of the second STA. In a further example, when both the first STA and second STA support the other station's current operating channel, the current operating channel may be selected as a current operating channel of either the first STA or the second STA. In yet another example, if neither the first STA nor the second STA support the other station's current operating channel, a channel is selected that both the first STA and the second STA support. In a particular embodiment, the selection is performed based on a predetermined priority stored in each of the first STA and the second STA, a shared algorithm, a priority shared during a discovery process, a priority shared in one of the transmitted messages of FIG. 2, another technique, or a combination thereof.

One or more probe messages may be sent over the selected channel at different rates to test a direct connection between the first STA and the second STA, at 515. For example, the second STA may transmit multiple probe messages to the first STA, where each probe message is transmitted at a different rate. The rates of the multiple probe messages may range from a highest rate that the second STA is capable of transmitting to a lowest rate that the second STA is capable of transmitting. The rates of the multiple probe messages may also range from a highest rate that the second STA is capable of transmitting to an estimated highest rate the second STA is capable of communicating with the first STA via multiple APs corresponding to the BSSs of the first STA and the second STA. The estimated highest rate the second STA is capable of communicating with the first STA may be based on a theoretical data rate or a measured data rate that is determined based on one or more factors, such as any of the first STA's, the second STA's, the first AP's, or the second AP's hardware or software, industry standard constraints (e.g., a regulatory standard), interference, or channel conditions. The second STA may receive an indication, via an AP of the first BSS and an AP of the second BSS (collectively "the APs"), that the first STA did not receive at least one of the probe messages. If the second STA receives the indication, a different channel may be selected for direct link communication or the first STA and the second STA may communicate via the APs.

The method 500 may also include determining whether an ACK message is received, at 520. The first STA may send the ACK message to the second STA in response to receiving the probe message. The ACK message may be transmitted and received at a rate (e.g., a data rate) corresponding to a rate with which the probe message was transmitted. If a determination is made by the second STA that the ACK message is not received, a different channel may be selected for communication or the first STA and the second STA may communicate via the APs (e.g., the AP of the first BSS and the AP of the second BSS), at 525. If a determination is made that the ACK message is received via the selected channel (e.g., the direct link), the method 500 may include determining a rate the first STA and the second STA can communicate at via the selected channel, at 530. For example, the rate at which the first STA and the second STA can communicate via the selected channel may be based on the rate at which the ACK message (or the probe message) was transmitted.

In a particular embodiment, the second STA may transmit the probe message multiple times to the first STA until the second STA receives an acknowledge (ACK) message from the first STA in order to test the direct link. For example, the second STA may transmit the probe messages at a set of different rates to the first STA. In a first illustrative embodiment, the set of rates may range from the highest rate the second STA is capable of transmitting to the lowest rate the second STA is capable of transmitting. In a second illustrative embodiment, the set of rates may range from the highest rate the second STA is capable of transmitting to the estimated highest rate the second STA is capable of communicating with the first STA via the first AP and the second AP instead of via the direct link formed. Accordingly, the second STA may first attempt to transmit the probe message over the selected channel (the direct link) at the highest rate the second STA is capable of transmitting. If the transmission succeeds and the first STA transmits the ACK to the second STA over the direct link, the first STA and the second STA can verify that the direct link formation has succeeded and that the rate of communication that can be achieved over the selected channel is the highest rate the second STA is capable of transmitting at.

If the transmission of the probe message fails at the highest rate the second STA is capable of transmitting (e.g., the first STA does not receive the probe message (e.g., a timeout period expires) and does not send the ACK to the second STA), the second STA tries sending the probe message over the selected channel at a lower rate until the lowest rate in the set of rates is tested. If the transmission of the probe message is successful at any rate (e.g., the first STA receives the probe message and transmits the ACK to the second STA), the direct link is formed and the data rate over the channel is set at the rate at which the probe message is successfully received. If the transmission of the probe message is not successful at any rate, the first STA and the second STA may communicate via the first AP and the second AP.

The method 500 also includes determining whether the rate at which the first STA and the second STA can communicate via the selected channel is greater than a rate at which the first STA and the second STA can communicate via the APs, at 535. If a determination is made that a rate associated with communication between the first STA and the second STA via the direct link is less than a rate associated with communication between the first STA and the second STA via the APs, then the first STA and the second STA communicate via the APs (i.e., the direct link is not used), at 540. If a determination is made that the rate associated with communication between the first STA and the second STA via the direct link is greater than the rate associated with communication between the first STA and the second STA via the APs, then the first STA and the second STA communicate directly via the selected channel, at 545.

In the case where the set of rates for transmitting the probe message ranges from the highest rate the second STA is capable of transmitting to the estimated highest rate the second STA is capable of communicating with the first STA via the first AP and the second AP, the first STA and the second STA may determine that any determination made that the direct link is formed based on receipt of the probe message and the ACK means that the first STA and the second STA can communicate over the direct link at a higher rate than via the first AP and the second AP. Accordingly, the first STA and the second STA may use the direct link for communication instead of communicating via the first AP and the second AP.

In the case where the set of rates for transmitting the probe message range from the highest rate the second STA is capable of transmitting to the lowest rate the second STA is capable of transmitting, the second STA and the first STA may make a determination of whether to use the direct link (if the probe message is successfully received) or communicate via the first AP and the second AP. For example, the first STA and/or the second STA may determine at which rate the probe message was successfully received and compare that to an estimated rate at which the first STA and/or the second STA can communicate via the first AP and the second AP. If the rate the probe message is successfully received is greater than the estimated rate, the first STA and the second STA may utilize the direct link. In a particular embodiment, if the rate the probe message was successfully received is less than the estimated rate, the first STA and the second STA may tear down the direct link and communicate via the first AP and the second AP. In another particular embodiment, if the rate the probe message was successfully received is less than the estimated rate, the first STA and the second STA may tear down the direct link and select a different channel with which to attempt to establish the direct link.

Accordingly, the first STA and the second STA may exchange channel information and select the channel for use in the direct link communication based on the exchanged channel information. One or more probe messages may be transmitted between the first STA and the second STA to verify communication and/or test a data rate of the selected channel. Based on the date rate of the selected channel, the first STA and the second STA may use the selected channel for the direct link, select a different channel to use for the direct link communication, or communicate via at least one of the first AP and the second AP. Thus, the direct link may be selectively established between the first STA and the second STA.

Figure 6:
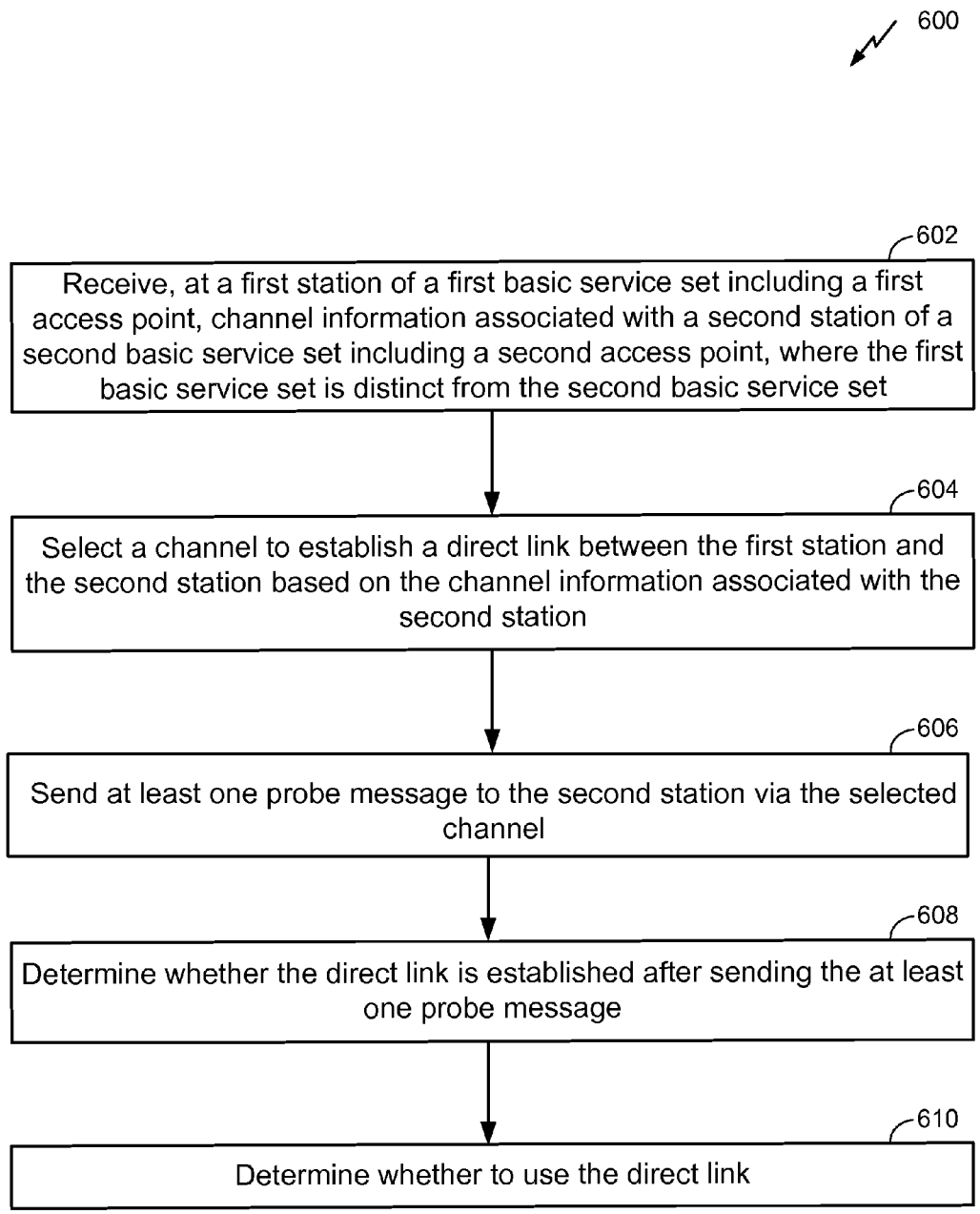
FIG. 6 is a flow diagram of a fourth illustrative embodiment of a method for setting up a direct link between a first STA and a second STA in the same ESS.

Referring to FIG. 6, a flow diagram of a fourth illustrative embodiment of a method 600 to enable direct link setup through an extended service set (ESS) using channel information is depicted. The method 600 may include receiving, at a first STA of a first BSS including a first AP, channel information associated with a second STA of a second BSS including a second AP, where the first BSS is distinct from the second BSS, at 602. Channel information associated with the first STA may also be determined at the first STA. For example, the first STA, the first AP, the second STA, and the second AP may include the STAs 120, the AP 110, the STAs 150, and the AP 140 of FIGS. 1-2, respectively.

A channel to establish a direct link between the first STA and the second STA may be selected based on the channel information associated with the second STA, at 604, and at least one probe message may be sent to the second STA via the selected channel, at 606. Sending the at least one probe message may include sending a plurality of probe messages to the second STA via the selected channel. In a particular embodiment, each probe message of the plurality of probe messages is sent at a different data transmission rate. The plurality of probe messages may be sent over a range of data transmission rates. For example, the range of data transmission rates may range from an attainable data transmission rate via the channel to an attainable data transmission rate via the first AP and the second AP.

A determination whether the direct link is established may be made after sending the at least one probe message, at 608. The determination may be made based on whether or not the at least one probe message was received by the second STA. Based on a determination that the direct link is not established via the channel, a different channel may be selected and a probe message may be sent to the second STA via the different channel.

A determination whether to use the direct link may be made, at 610. Determining whether to use the direct link may include determining a first data transmission rate associated with communication between the first STA and the second STA via the channel and determining a second data transmission rate to communicate between the first STA and the second STA via the first AP and the second AP. The first data transmission rate may be compared to the second data transmission rate to determine whether to use the direct link. For example, when the first data transmission rate is greater than or equal to the second data transmission rate, the first STA and the second STA may communicate via the direct link. As another example, when the second data transmission rate is greater than or equal to the first transmission rate, the first STA and the second STA may communicate via the first AP and the second AP. In an alternative embodiment, the determination whether to use the direct link may be based on a comparison of the first transmission rate to a threshold transmission rate. For example, when the first transmission rate satisfies (e.g., is greater than or equal to) the threshold transmission rate, the first STA and the second STA may communicate via the direct link.

One of ordinary skill in the art should understand that methods, such as the method 300 of FIG. 3, the method 400 of FIG. 4, the method 500 of FIG. 5, and the method 600 of FIG. 6, described herein are merely illustrative. One or more of the steps of the methods (e.g., processes) may be removed, additional steps may be added, the order of steps changed, or combinations thereof, while still remaining consistent with the disclosure herein.

The method 300 of FIG. 3, the method 400 of FIG. 4, the method 500 of FIG. 5, the method 600 of FIG. 6, or any combination thereof, may be implemented or otherwise performed by a field-programmable gate array (FPGA) device, an application-specific integrated circuit (ASIC), a processing unit such as a central processing unit (CPU), a digital signal processor (DSP), a controller, another hardware device, a firmware device, or any combination thereof. As an example, the method 300 of FIG. 3, the method 400 of FIG. 4, the method 500 of FIG. 5, the method 600 of FIG. 6, or any combination thereof, can be initiated by a processor (e.g., a processor 704 or a processor 720) that executes instructions stored in the memory 706, as described with respect to FIG. 7.

Figure 7:
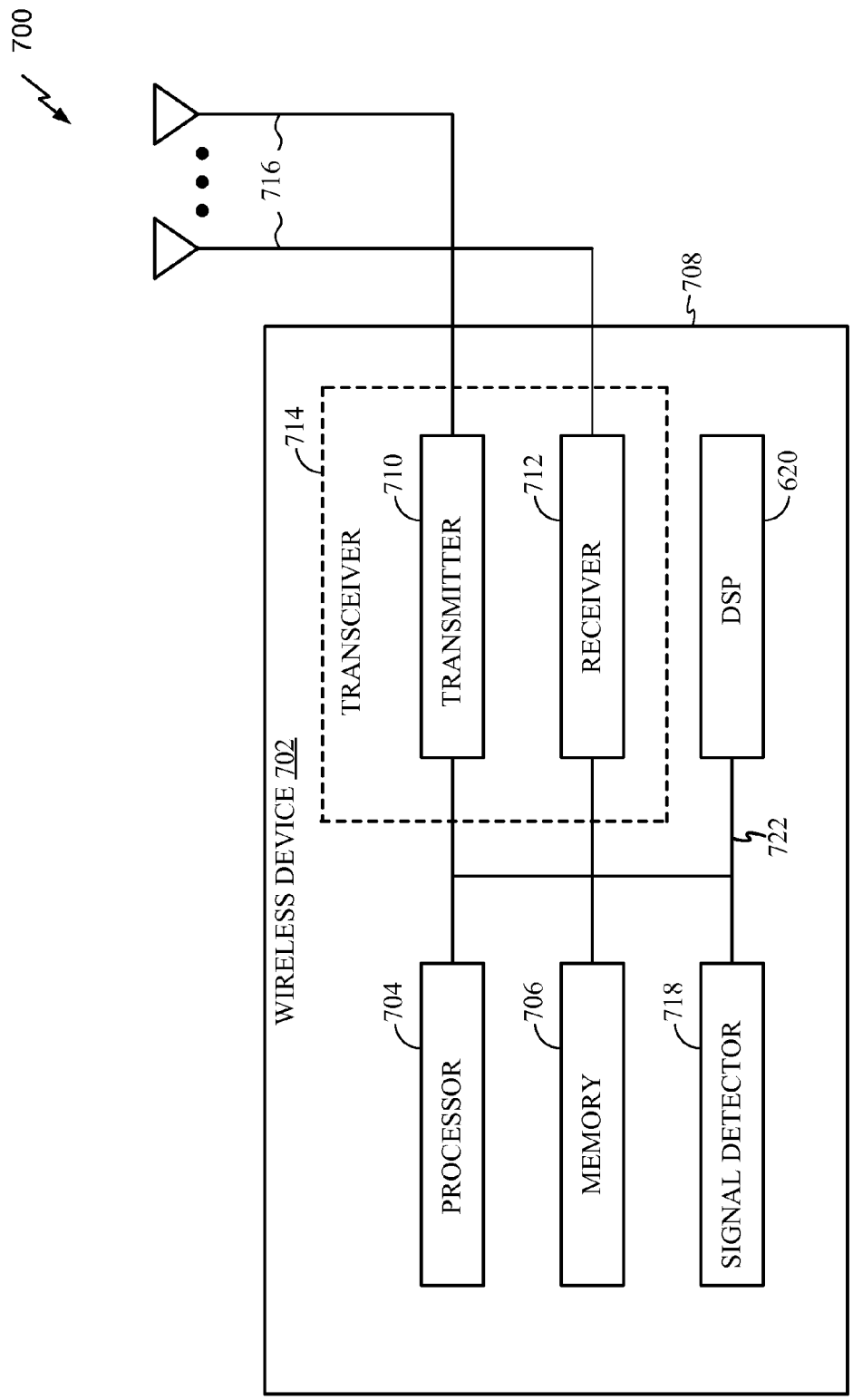
FIG. 7 is a block diagram of a particular embodiment of a wireless device that may be used in the wireless system of FIG. 1.

FIG. 7 is a diagram to illustrate a system 700 that includes a wireless device 702 that may be employed within the system 100 of FIG. 1. The wireless device 702 is an example of a device that may be configured to implement the various methods, such as the methods of FIGS. 3-6, described herein. The wireless device 702 may include the APs 110, 140 or the STAs 120, 150 of FIGS. 1-2.

The wireless device 702 may include various components, such as a processor 704, a memory 706, a signal detector 718, a transceiver 714, and a digital signal processor (DSP) 720. The wireless device 702 may also include a housing 708 that includes a transmitter 710 and a receiver 712. The various components of the wireless device 702 may be coupled together via a bus system 722. The bus system 722 may include a power bus, a control signal bus, a status signal bus, a data bus, or a combination thereof.

The processor 704 may control operation of the wireless device 702. The processor 704 may also be referred to as a central processing unit (CPU). Memory 706, which may include read-only memory (ROM), random access memory (RAM), or a combination thereof, may provide instructions and/or data to the processor 704. A portion of the memory 706 may also include non-volatile random access memory (NVRAM). The processor 704 may perform logical and arithmetic operations based on program instructions stored within the memory 706 or another memory (not shown) external to the wireless device 702. The instructions in the memory 706 may be executable to implement the methods described herein, such as the methods of FIGS. 3-6. Further, the memory 706 may include (e.g., store) software that is executable by either of the processor 704 and/or the processor 720. In a particular embodiment, the processor 704 and the DSP 720 may be included in a single processor configured to perform one or more functions of each of the processor 704 and the DSP 720.

The transmitter 710 and the receiver 712 may allow transmission and reception of data between the wireless device 702 and a remote location. The transmitter 710 and the receiver 712 may be combined into a transceiver 714. A plurality of transmit antennas 716 may be attached to the housing 708. Each of the plurality of transmit antennas 716 may be electrically coupled to the transceiver 714. The wireless device 702 may also include (not shown) multiple transmitters, multiple receivers, and multiple transceivers. In a particular embodiment, the transceiver 714 may be included in a wireless interface (not shown) that is coupled to the processor 704 and/or the DSP 720. In a particular embodiment, the processor 704 or the DSP 720 may be configured to initiate establishment of a direct link between the device 700 and another device via the transceiver 714. The transceiver 714 may be configured to transmit a probe message over a selected communication channel (e.g., to be used as the direct link) to test a data rate over the communication channel.

The signal detector 718 may be used to detect and quantify a level of signals received via the transceiver 714. For example, the signal detector 718 may detect a total energy, an energy per subcarrier per symbol, a power spectral density, and other signals. The wireless device 702 may also include a digital signal processor (DSP) 720 for use in processing signals (e.g., communication signals).

In an exemplary embodiment, the processor 704 or the DSP 720 may be configured to execute processor-executable instructions (e.g., computer executable instructions) stored at a non-transitory computer-readable medium, such as the memory 706, and the processor-executable instructions are executable to cause a computer, such as the processor 704 or the DSP 720, to store, at a first wireless apparatus, first channel information regarding one or more first communication channels the first wireless apparatus is capable of communicating over and one or more second communication channels the first wireless apparatus is currently communicating over via a first access point. The processor-executable instructions are further executable to cause the computer, such as the processor 704 or the DSP 720, to receive a direct link setup message from a second wireless apparatus as part of a process of forming a direct link between the first wireless apparatus and the second wireless apparatus. The direct link setup message includes second channel information regarding one or more third communication channels the second wireless apparatus is capable of communicating over and one or more fourth communication channels the second wireless apparatus is currently communicating over via a second access point. The one or more second communication channels are different than the one or more fourth communication channels. The processor-executable instructions are further executable to cause the computer, such as the processor 704 or the DSP 720, to select at least one communication channel for communication based on the first channel information and the second channel information.

In another exemplary embodiment, the processor 704 or the DSP 720 may be configured to execute processor-executable instructions (e.g., computer executable instructions) stored at a non-transitory computer-readable medium, such as the memory 706, and the processor-executable instructions are executable to cause a computer, such as the processor 704 or the DSP 720, to receive, at a first station of a first basic service set including a first access point, channel information associated with a second station of a second basic service set including a second access point. The first basic service set is distinct from the second basic service set. The processor-executable instructions are further executable to cause the computer, such as the processor 704 or the DSP 720, to select a channel to establish a direct link between the first station and the second station based on the channel information associated with the second station. The processor-executable instructions are further executable to cause the computer, such as the processor 704 or the DSP 720, to send at least one probe message to the second station via the selected channel and to determine that the direct link is established after sending the at least one probe message.

The wireless device 702 may include one or more optional components (not shown). For example, the wireless device may include a display controller. The display controller may be coupled to the processor 704, the DSP 720, the bus system 722, or a combination thereof. The display controller may be coupled to a display device included in or external to the wireless device 702. The wireless device 702 may also include a coder/decoder (CODEC) that can also be coupled to the processor 704, the DSP 720, the bus system 722, or a combination thereof A speaker and a microphone can be coupled to the CODEC.

In a particular embodiment, the processor 704, the DSP 720, the memory 706, the wireless transceiver 714, and the signal detector 718 are included in a system-in-package or system-on-chip device included in the wireless device 702. In a particular embodiment, an input device and a power supply are coupled to the system-on-chip device. Moreover, in a particular embodiment, the display device, the input device, the speaker, the microphone, the antennas 716, and the power supply are external to the system-on-chip device. However, each of the display device, the input device, the speaker, the microphone, the antennas 716, and the power supply can be coupled to a component of the system-on-chip device of the wireless device 702, such as an interface or a controller.

Figure 8:
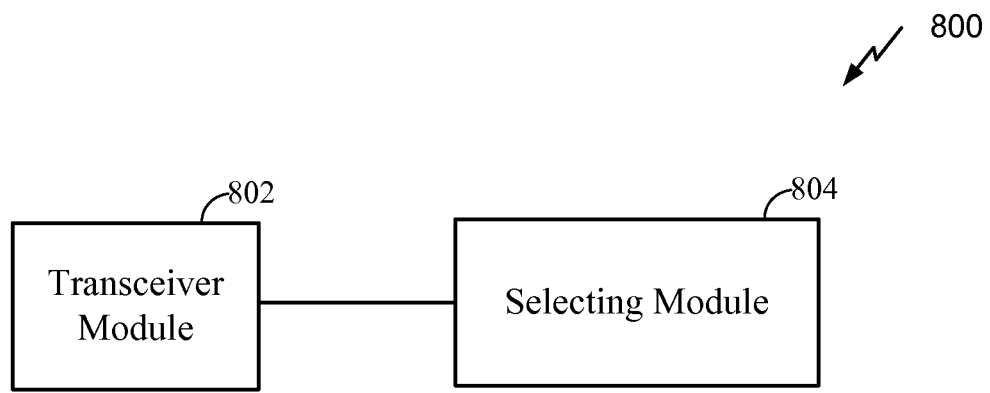
FIG. 8 is a functional block diagram of another exemplary wireless device that may be employed within the wireless system of FIG. 1.

FIG. 8 is a functional block diagram of components of an exemplary wireless device 800 that may be employed within the wireless communication system 100 of FIG. 1. The components of the wireless device 800 may be included in the APs 110, 140 or the STAs 120, 150 of FIGS. 1-2, and the wireless device 602 of FIG. 6. The wireless device 800 may include a transceiver module 802 and a selecting module 804.

The transceiver module 802 may be configured to transmit/receive frames of data to/from other devices. The transceiver module 802 may be configured to perform one or more functions as described with reference to FIGS. 1-7. The transceiver module 802 may correspond to the transmitter 710, the receiver 712, the transceiver 714, the signal detector 718, the processor 704, and/or the DSP 720 of FIG. 7, for example.

The selecting module 804 may be configured to select a communication channel for communication with another device (e.g., another STA). The selecting module 804 may be configured to perform functions as described with reference to FIGS. 1-7. The selecting module 804 may correspond to the processor 704, the DSP 720, and/or the signal detector 718 of FIG. 7, for example.

In conjunction with one or more of the described embodiments, an apparatus is disclosed that may include first means for communicating information with a second means for communicating, the first means for communicating configured to receive a direct link setup message from the second means for communicating as part of forming a direct link between the first means for communicating and the second means for communicating. The first means for communicating information with a second means for communicating may include the transmitter 710, the receiver 712, the transceiver 714, the signal detector 718, the processor 704, the DSP 720 of FIG. 7, the transceiver module 802 of FIG. 8, one or more other devices or circuits configured to communicate information with a second means for communicating, or any combination thereof.

The apparatus may also include means for storing first channel information regarding one or more first communication channels the first means for communicating is capable of communicating over and one or more second communication channels the first means for communicating is communicating over. The means for storing first channel information may include the memory 706 of FIG. 7, one or more other devices or circuits configured to store first channel information, or any combination thereof.

The apparatus may also include means for selecting at least one communication channel for communication based on the first channel information and the second channel information. The means for selecting at least one communication channel may include the processor 704, the DSP 720, the signal detector 718 of FIG. 7, the selecting module 804 of FIG. 8, one or more other devices or circuits configured to select at least one communication channel, or any combination thereof.

The apparatus may also include means for transmitting a probe message over the selected at least one communication channel to test a data rate over the at least one communication channel. The means for transmitting may include the transmitter 710, the receiver 712, the transceiver 714, the signal detector 718, the processor 704, the DSP 720 of FIG. 7, the transceiver module 802 of FIG. 8, one or more other devices or circuits configured to transmit a probe message, or any combination thereof.

The apparatus may also include means for determining whether the first means for communicating is capable of communicating on at least one of the one or more third communication channels the second means for communicating is capable of communicating over. The means for determining may include the processor 704, the DSP 720, the signal detector 718 of FIG. 7, the selecting module 804 of FIG. 8, one or more other devices or circuits configured to determine whether the first means for communicating is capable of communicating on at least one of the one or more third communication channels the second means for communicating is capable of communicating over, or any combination thereof.

The apparatus may also include means for determining whether the first means for communicating is capable of communicating on at least one of the one or more fourth communication channels the second means for communicating is communicating over via a second access point. The means for determining may include the processor 704, the DSP 720, the signal detector 718 of FIG. 7, the selecting module 804 of FIG. 8, one or more other devices or circuits configured to determine whether the first means for communicating is capable of communicating on at least one of the one or more fourth communication channels the second means for communicating is communicating over via a second access point, or any combination thereof.

The apparatus may also include means for determining whether the second means for communicating is capable of communicating on at least one of the one or more first communication channels the first means for communicating is capable of communicating over. The means for determining may include the processor 704, the DSP 720, the signal detector 718 of FIG. 7, the selecting module 804 of FIG. 8, one or more other devices or circuits configured to determine whether the second means for communicating is capable of communicating on at least one of the one or more first communication channels the first means for communicating is capable of communicating over, or any combination thereof.

The apparatus may also include means for determining whether the second means for communicating is capable of communicating on at least one of the one or more second communication channels the first means for communicating is communicating over via a first access point. The means for determining may include the processor 704, the DSP 720, the signal detector 718 of FIG. 7, the selecting module 804 of FIG. 8, one or more other devices or circuits configured to determine whether the second means for communicating is capable of communicating on at least one of the one or more second communication channels the first means for communicating is communicating over via a first access point, or any combination thereof.

In conjunction with one or more of the described embodiments, another apparatus is disclosed that may include means for receiving, at a first station of a first basic service set including a first access point, channel information associated with a second station of a second basic service set including a second access point. The means for receiving may include the receiver 712, the transceiver 714, the signal detector 718, the processor 704, the DSP 720 of FIG. 7, the transceiver module 802 of FIG. 8, one or more other devices or circuits configured to receive channel information, or any combination thereof.

The apparatus may also include means selecting a channel to establish a direct link between the first station and the second station based on the channel information associated with the second station. The means for selecting may include the processor 704, the DSP 720, the signal detector 718 of FIG. 7, the selecting module 804 of FIG. 8, one or more other devices or circuits configured to select a channel, or any combination thereof.

The apparatus may also include means for sending at least one probe message to the second station via the selected channel. The means for sending may include the transmitter 710, the transceiver 714, the signal detector 718, the processor 704, the DSP 720 of FIG. 7, the transceiver module 802 of FIG. 8, one or more other devices or circuits configured to send at least one probe message to the second station via the selected channel, or any combination thereof.

The apparatus may also include means for determining that the direct link is established after sending the at least one probe message. The means for determining may include the processor 704, the DSP 720, the signal detector 718 of FIG. 7, the selecting module 804 of FIG. 8, one or more other devices or circuits configured to determine that the direct link is established after sending the at least one probe message, or any combination thereof.

The apparatus may also include means for determining, at the first station, channel information associated with the first station. The means for determining may include the processor 704, the DSP 720, the signal detector 718 of FIG. 7, the selecting module 804 of FIG. 8, one or more other devices or circuits configured to determine channel information associated with the first station, or any combination thereof.

The apparatus may also include means for storing, at the first station, the channel information associated with the first station. The means for storing may include the memory 706 of FIG. 7, one or more other devices or circuits configured to store the channel information associated with the first station, or any combination thereof.

The apparatus may also include means for determining a first data transmission rate to communicate between the first station and the second station via the channel. The means for determining may include the processor 704, the DSP 720, and the signal detector 718 of FIG. 7, the selecting module 804 of FIG. 8, one or more other devices or circuits configured to determine a first data transmission rate to communicate between the first station and the second station via the channel, or any combination thereof.

The apparatus may also include means for determining a second data transmission rate to communicate between the first station and the second station via the first access point and the second access point. The means for determining may include the processor 704, the DSP 720, the signal detector 718 of FIG. 7, the selecting module 804 of FIG. 8, one or more other devices or circuits configured to determine a second data transmission rate to communicate between the first station and the second station via the first access point and the second access point, or any combination thereof.

The apparatus may also include means for comparing the first data transmission rate to the second data transmission rate. The means for comparing may include the processor 704, the DSP 720, the signal detector 718 of FIG. 7, the selecting module 804 of FIG. 8, one or more other devices or circuits (e.g., a comparator) configured to compare the first data transmission rate to the second data transmission rate, or any combination thereof.

One or more of the disclosed embodiments may be implemented in a system or an apparatus, such as the device 700 or the device 800, that may include a communications device, a fixed location data unit, a mobile location data unit, a mobile phone, a cellular phone, a computer, a tablet, a portable computer, or a desktop computer. Additionally, the system or the apparatus may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, any other device that stores or retrieves data or computer instructions, or a combination thereof. As another illustrative, non-limiting example, the system or the apparatus may include remote units, such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof. Although one or more of FIGS. 1-8 may illustrate systems, apparatuses, and/or methods according to the teachings of the disclosure, the disclosure is not limited to these illustrated systems, apparatuses, and/or methods. Embodiments of the disclosure may be suitably employed in any device that includes integrated circuitry including memory, a processor, and on-chip circuitry.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

Various illustrative components, blocks, configurations, modules, circuits, and steps have been described above generally in terms of their functionality. Whether such functionality is implemented as hardware or processor executable instructions depends upon the particular application and design constraints imposed on the overall system. Additionally, the various operations of methods described above may be performed by any suitable means capable of performing the operations, such as various hardware and/or software component(s), circuits, and/or module(s). Generally, any operations illustrated with respect to the FIGS. 1-8 may be performed by corresponding functional means capable of performing the operations. Skilled artisans may implement the described functionality in varying ways for each particular application, but such implementation decisions should not be interpreted as causing a departure from the scope of the present disclosure.

Those of skill would further appreciate that the various illustrative logical blocks, configurations, modules, circuits, and algorithm steps described in connection with the embodiments disclosed herein may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components (e.g. electronic hardware), computer software executed by a processor, or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on as one or more instructions or code on a computer-readable medium. Computer-readable media includes computer-readable storage media and communication media including any medium that facilitates transfer of a computer program from one place to another. A storage media may be any available media that can be accessed by a computer.

By way of example, and not limitation, such computer-readable storage media can comprise random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), other optical disk storage, magnetic disk storage, or other magnetic storage devices, or any other medium that can be used to store desired program code in the form of instructions or data structures and that can be accessed by a computer. In the alternative, the computer-readable media (e.g., a storage medium) may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may comprise a computer program product for performing the operations presented herein. For example, such a computer program product may comprise a computer readable storage medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. Alternatively, various methods described herein can be provided via storage means (e.g., RAM, ROM, a physical storage medium such as a compact disc (CD) or floppy disk, etc.). Moreover, any other suitable technique for providing the methods and techniques described herein to a device can be utilized.

It is to be understood that the claims are not limited to the precise configuration and components illustrated above. The previous description of the disclosed embodiments is provided to enable a person skilled in the art to make or use the disclosed embodiments. While the foregoing is directed to aspects of the present disclosure, other and further aspects of the disclosure may be devised without departing from the basic scope thereof, and the scope is determined by the claims that follow. Various modifications, changes and variations may be made in the arrangement, operation, and details of the embodiments described herein without departing from the scope of the disclosure or the claims. Thus, the present disclosure is not intended to be limited to the embodiments herein but is to be accorded the widest scope possible consistent with the principles and novel features as defined by the following claims and equivalents thereof.

What is claimed is:

1. A method of operating a first wireless apparatus associated with a first access point of a first basic service set included in an extended service set, the method comprising:
  storing first channel information, the first channel information comprising:
    one or more first communication channels the first wireless apparatus is capable of communicating over, and
    one or more second communication channels the first wireless apparatus is communicating over via the first access point;

receiving a direct link setup message from a second wireless apparatus associated with a second access point of a second basic service set included in the extended service set to form a direct link between the first wireless apparatus and the second wireless apparatus, the direct link setup message comprising second channel information, the second channel information comprising:
  one or more third communication channels the second wireless apparatus is capable of communicating over, and
  one or more fourth communication channels the second wireless apparatus is communicating over via the second access point;
  selecting at least one communication channel for direct link communication between the first wireless apparatus and the second wireless apparatus based, at least in part, on the first channel information and the second channel information;
transmitting two or more probe messages over the selected communication channel, each probe message having a different data rate;
selecting a different communication channel for direct link communication if an acknowledgement is not received in response to at least one of the probe messages;
determining a data rate for the direct link communication; and
communicating with the second wireless apparatus via the second access point if the data rate for the direct link communication is less than a data rate associated with communications via the second access point.

2. The method of claim 1, further comprising determining whether the direct link is established after transmitting the one or more probe messages.

3. The method of claim 1, further comprising receiving a probe message over the selected at least one communication channel to test a data rate over the at least one communication channel.

4. The method of claim 1, further comprising receiving the direct link setup message from the second wireless apparatus via the first access point and the second access point.

5. The method of claim 1, wherein selecting the at least one communication channel comprises:
  determining whether the second wireless apparatus is capable of communicating over at least one of the one or more second communication channels; and
  selecting at least one of the one or more second communication channels as the at least one communication channel based, at least in part, on determining that the second wireless apparatus is capable of communicating over at least one of the one or more second communication channels.

6. The method of claim 1, wherein selecting the at least one communication channel comprises:
  determining whether the second wireless apparatus is capable of communicating over at least one of the one or more second communication channels; and
  selecting at least one of the one or more fourth communication channels as the at least one communication channel based, at least in part, on determining that the second wireless apparatus is not capable of communicating over at least one of the one or more second communication channels.

7. The method of claim 1, wherein selecting the at least one communication channel comprises:
  determining whether the second wireless apparatus is capable of communicating over at least one of the one or more first communication channels; and
  selecting at least one of the one or more first communication channels as the at least one communication channel based, at least in part, on determining that the second wireless apparatus is capable of communicating over at least one of the one or more first communication channels.

8. The method of claim 1, wherein selecting the at least one communication channel comprises:
  determining whether the second wireless apparatus is capable of communicating over at least one of the one or more first communication channels; and
  selecting at least one of the one or more third communication channels as the at least one communication channel based, at least in part, on determining that the second wireless apparatus is not capable of communicating over at least one of the one or more first communication channels.

9. The method of claim 1, wherein selecting the at least one communication channel comprises:
  determining whether the first wireless apparatus is capable of communicating over at least one of the one or more fourth communication channels;
  determining whether the second wireless apparatus is capable of communicating over at least one of the one or more second communication channels; and
  selecting at least one of the one or more second communication channels as the at least one communication channel based, at least in part, on determining that the second wireless apparatus is capable of communicating over at least one of the one or more second communication channels and that the first wireless apparatus is capable of communicating over at least one of the one or more fourth communication channels.

10. The method of claim 9, wherein selecting the at least one communication channel comprises:
  determining whether a particular channel is included in both the one or more first communication channels and the one or more third communication channels; and
  selecting the particular channel as the at least one communication channel.

11. The method of claim 1, further comprising:
  the first wireless apparatus notifying the first access point that the first wireless apparatus is entering a power save mode; and
  the first wireless apparatus switching to the at least one selected communication channel for direct link communication between the first wireless apparatus and the second wireless apparatus after notifying the first access point that the first wireless apparatus is entering the power save mode.

12. The method of claim 11, further comprising, after notifying the first access point that the first wireless apparatus is entering the power save mode, the first wireless apparatus engaging in communication with the second wireless apparatus over the at least one selected communication channel in an active mode without entering the power save mode according to the notification.

13. The method of claim 1, further comprising:
  entering a power save mode with the first access point; and
  switching from the at least one selected communication channel to a different channel for direct link communication between the first wireless apparatus and the second wireless apparatus.

14. The method of claim 1, wherein the probe message is a null frame.

15. The method of claim 1 further comprising identifying the first wireless apparatus as the initiator, wherein the selecting comprises using the one or more first communication channels and the one or more second communication channels as a reference set upon identifying the first wireless apparatus as the initiator.

16. An apparatus comprising:
a first transceiver configured to, while associated with a first access point of a first basic service set included in an extended service set, receive a direct link setup message from a second transceiver associated with a second access point of a second basic service set included in the extended service set as part of forming a direct link between the first transceiver and the second transceiver;
a memory configured to store first channel information regarding one or more first communication channels the first transceiver is capable of communicating over, and one or more second communication channels the first transceiver is communicating over via the first access point, wherein the direct link setup message comprises second channel information regarding one or more third communication channels the second transceiver is capable of communicating over, and one or more fourth communication channels the second transceiver is communicating over via the second access point; and
a processor configured to:
select at least one communication channel for direct link communication between the first transceiver and the second transceiver based, at least in part, on the first channel information and the second channel information;
transmit two or more probe messages over the selected communication channel, each probe message having a different data rate;
select a different communication channel for direct link communication if an acknowledgement is not received in response to at least one of the probe messages;
determine a data rate for the direct link communication; and
communicate with the second transceiver via the second access point if the data rate for the direct link communication is less than a data rate associated with communications via the second access point.

17. The apparatus of claim 16, wherein the one or more second communication channels include at least one particular communication channel that is different than any of the one or more fourth communication channels.

18. The apparatus of claim 16, wherein the processor is configured to select the at least one communication channel by:
determining whether the second transceiver is capable of communicating on at least one of the one or more second communication channels; and
selecting at least one of the one or more second communication channels as the at least one communication channel based, at least in part, on determining that the second transceiver is capable of communicating on at least one of the one or more second communication channels.

19. The apparatus of claim 16, wherein the processor is configured to select the at least one communication channel by:
determining whether the second transceiver is capable of communicating on at least one of the one or more second communication channels; and
selecting at least one of the one or more fourth communication channels as the at least one communication channel based, at least in part, on determining that the second transceiver is not capable of communicating on at least one of the one or more second communication channels.

20. The apparatus of claim 16, wherein the processor is configured to select the at least one communication channel by:
determining whether the first transceiver is capable of communicating on at least one of the one or more fourth communication channels; and
selecting at least one of the one or more fourth communication channels as the at least one communication channel based, at least in part, on determining that the first transceiver is capable of communicating on at least one of the one or more fourth communication channels.

21. The apparatus of claim 20, wherein the at least one of the one or more fourth communication channels is selected as the at least one communication channel based, at least in part, on determining the second transceiver is capable of communicating on at least one of the one or more second communication channels.

22. The apparatus of claim 16, wherein the processor is configured to select the at least one communication channel by:
determining whether the first transceiver is capable of communicating on at least one of the one or more fourth communication channels;
determining whether the second transceiver is capable of communicating on at least one of the one or more second communication channels; and
selecting at least one of the one or more second communication channels as the at least one communication channel based, at least in part, on determining the second transceiver is capable of communicating on at least one of the one or more second communication channels and the first transceiver is capable of communicating on at least one of the one or more fourth communication channels.

23. An apparatus comprising:
first means for communicating information with a second means for communicating, the first means for communicating configured to receive a direct link setup message from the second means for communicating as part of forming a direct link between the first means for communicating and the second means for communicating;
means for storing first channel information regarding one or more first communication channels the first means for communicating is capable of communicating over, and one or more second communication channels the first means for communicating is communicating over via a first access point, wherein the direct link setup message comprises second channel information regarding one or more third communication channels the second means for communicating is capable of communicating over, and one or more fourth communication channels the second means for communicating is communicating over via a second access point;
means for selecting at least one communication channel for direct link communication based, at least in part, on the first channel information and the second channel information;
means for transmitting two or more probe messages over the selected communication channel, each probe message having a different data rate;
means for selecting a different communication channel for direct link communication if an acknowledgement is not received in response to at least one of the probe messages;
means for determining a data rate for the direct link communication; and means for communicating with the second means for communicating via the second access point if the data rate for the direct link communication is less than a data rate associated with communications via the second access point.

24. The apparatus of claim 23, further comprising:
means for determining whether the first means for communicating is capable of communicating on at least one of the one or more third communication channels; and
means for determining whether the first means for communicating is capable of communicating on at least one of the one or more fourth communication channels.

25. The apparatus of claim 23, further comprising:
means for determining whether the second means for communicating is capable of communicating on at least one of the one or more first communication channels; and
means for determining whether the second means for communicating is capable of communicating on at least one of the one or more second communication channels.

26. A non-transitory processor-readable medium comprising instructions that, when executed by a processor, cause the processor to:
store, at a first wireless apparatus, first channel information regarding one or more first communication channels the first wireless apparatus is capable of communicating over, and one or more second communication channels the first wireless apparatus is communicating over via a first access point;
receive a direct link setup message from a second wireless apparatus as part of a process of forming a direct link between the first wireless apparatus and the second wireless apparatus, the direct link setup message comprising second channel information regarding one or more third communication channels the second wireless apparatus is capable of communicating over, and one or more fourth communication channels the second wireless apparatus is communicating over via a second access point;
select at least one communication channel for direct link communication between the first wireless apparatus and the second wireless apparatus based on the first channel information and the second channel information;
transmit two or more probe messages over the selected communication channel, each probe message having a different data rate;
select a different communication channel for direct link communication if an acknowledgement is not received in response to at least one of the probe messages;
determine a data rate for the direct link communication; and
communicate with the second wireless apparatus via the second access point if the data rate for the direct link communication is less than a data rate associated with communications via the second access point.

27. The non-transitory processor-readable medium of claim 26, further comprising instructions that, when executed by the processor, cause the processor to:
determine whether the first wireless apparatus is capable of communicating on at least one of the one or more fourth communication channels; and
determine whether the second wireless apparatus is capable of communicating on at least one of the one or more second communication channels.

28. The non-transitory processor-readable medium of claim 26, further comprising instructions that, when executed by the processor, cause the processor to select the at least one communication channel based, at least in part, on the one or more first communication channels and the one or more third communication channels each comprising the at least one communication channel.

29. The non-transitory processor-readable medium of claim 26, wherein at least one communication channel of the one or more second communication channels is different than any of the one or more fourth communication channels.

30. A method comprising:
receiving, at a first station of a first basic service set including a first access point, channel information associated with a second station of a second basic service set including a second access point, wherein the first basic service set is distinct from the second basic service set and the channel information comprises:
one or more first communication channels that the second station is capable of communicating over; and
one or more second communication channels that the second station is communicating over via the second access point;
selecting a channel to establish a direct link between the first station and the second station based, at least in part, on the channel information associated with the second station;
transmitting two or more probe messages over the selected channel, each probe message having a different data rate;
selecting a different channel for direct link communication if an acknowledgement is not received in response to at least one of the probe messages;
determining a data rate for the direct link; and
communicating with the second station via the second access point if the data rate for the direct link is less than a data rate associated with communications via the second access point.

31. The method of claim 30, wherein the different data rates range from a highest data transmission rate via the selected channel to a highest data transmission rate via the first access point and the second access point.

32. The method of claim 30, further comprising:
determining, at the first station, channel information associated with the first station; and
storing, at the first station, the channel information associated with the first station.

33. The method of claim 30, further comprising:
determining that the direct link is not established via the selected channel; selecting a different channel; and
sending a probe message to the second station via the different channel.

34. The method of claim 30, further comprising:
determining a first data rate to communicate between the first station and the second station via the selected channel;
determining a second data rate to communicate between the first station and the second station via the first access point and the second access point; and
comparing the first data rate to the second data rate.

35. The method of claim 30, further comprising sending a direct link setup message from the first station to the second station via the first access point and the second access point.

36. The method of claim 30, wherein transmitting one or more probe messages includes:
transmitting multiple probe messages to the second station via direct link communication over the selected channel;
transmitting a first of the multiple probe messages to the second station via direct link communication at a first highest data transmission rate at which the first station is capable of transmitting; and transmitting one or more additional probe messages at successively lower data transmission rates to the second station via direct link communication over the selected channel until a first of the following occurs:
the first station receives an acknowledgement message from the second station over the selected channel; and
expiration of a timeout period associated with a probe message of the one or more additional probe messages sent at a lowest data transmission rate of a range of data transmission rates that ranges from the first highest data transmission rate to a second highest data transmission rate at which the first station is capable of communicating with the second station via the first access point and the second access point.

37. The method of claim 30, wherein the one or more probe messages are transmitted through a range of data rates ranging from a first highest data transmission rate at which the second station is capable of communicating with the first station via the first access point and the second access point to a second highest data transmission rate at which the second station is capable of communicating.

\* \* \* \* \*